(12) United States Patent
Akamatsu et al.

(10) Patent No.: US 6,317,465 B1
(45) Date of Patent: Nov. 13, 2001

(54) DATA TRANSMISSION SYSTEM

(75) Inventors: Hironori Akamatsu; Hiroyuki Yamauchi, both of Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/247,459

(22) Filed: Feb. 9, 1999

(30) Foreign Application Priority Data

Feb. 10, 1998 (JP) .................................................. 10-028129
Feb. 10, 1998 (JP) .................................................. 10-028133

(51) Int. Cl.[7] ............................... H04B 3/00; H04L 25/00
(52) U.S. Cl. ........................................................... 375/257
(58) Field of Search ..................................... 375/257, 222, 375/219, 220, 258, 259, 260, 288, 295, 316; 333/12

(56) References Cited

U.S. PATENT DOCUMENTS

| | | | |
|---|---|---|---|
| 4,280,221 | * 7/1981 | Chun et al. ........................... | 375/288 |
| 4,423,506 | * 12/1983 | Kawasaki et al. .................... | 370/221 |
| 4,539,680 | * 9/1985 | Boudon et al. ....................... | 370/509 |
| 4,642,805 | * 2/1987 | Dumas et al. ........................ | 370/359 |

* cited by examiner

*Primary Examiner*—Stephen Chin
*Assistant Examiner*—Lenny Jiang
(74) *Attorney, Agent, or Firm*—Harness, Dickey & Pierce, P.L.C.

(57) ABSTRACT

Differential transmission of each of two bits D0 and D1 is accomplished with three lines disposed between a transmitting unit and a receiving unit. One of the three lines is a first data line corresponding to the bit D0. Another of the three lines is a second data line corresponding to the bit D1. The remaining one of the three lines is a reference line. When the bits D0 and D1 have different values, without involving the use of the reference line, the second data line serves as a transmission path complementary to the first data line, while the first data line serves as a transmission path complementary to the second data line. When the bits D0 and D1 have equal values, a voltage representing a value obtained by inverting each of the data bits D1 and D1 is supplied to the reference line such that the reference line serves as a transmission path complementary to each of the first and second data lines.

21 Claims, 22 Drawing Sheets

Fig. 4

| DL0 | VH (+I) | VH (+I) | VL (−I) | VL (−I) |
|---|---|---|---|---|
| DL1 | VH (+I) | VL (−I) | VH (+I) | VL (−I) |
| REF0 | VL (−2I) | VTT (0) | VTT (0) | VH (+2I) |

| DL0 | VH (+I) | VH (+I) | VL (−I) | VL (−I) |
|---|---|---|---|---|
| DL1 | VH (+I) | VL (−I) | VH (+I) | VL (−I) |
| REF0 | VLL (−2I) | VTT (0) | VTT (0) | VHH (+2I) |

| DL0 | VH | VH | VL | VL |
|---|---|---|---|---|
| XDL0 | VL | VL | VH | VH |
| DL1 | VH | VL | VH | VL |

EN1=H

DATA TRANSMISSION SYSTEM

BACKGROUND OF THE INVENTION

The present invention relates to a data transmission system for accomplishing differential transmission of each of a plurality of data bits.

Against the background of an enormous amount of dynamic image data to be processed, high-speed data transmission between a plurality of semiconductor integrated circuits mounted on a printed wiring board has been in increasing demand. To satisfy the demand, a Rambus standard and a SyncLink standard have been known in the field of DRAM (dynamic random access memory) development as standards for clock-synchronized high-speed I/O interfaces. The former standard has been developed by Rambus, Inc. and adopts an open-drain interface. The latter standard has been proposed by JEDEC (Joint Electron Device Engineering Council) and adopts a low-amplitude interface termed a SSTL (stub series terminated transceiver logic) interface.

Each of the conventional I/O interface standards mentioned above has been devised to transmit one data bit over a single data line. Such a single-ended transmission scheme has the drawback of susceptibility to external noise.

There has conventionally been known differential data transmission which is excellent in common-mode noise rejecting performance. The differential data transmission accomplishes the transmission of one data bit by using a pair of data lines. However, if each of a plurality of data bits is to be differentially transmitted between semiconductor integrated circuits on a printed wiring board, the number of lines required is doubled compared with the number of wires used in the foregoing single-ended transmission scheme. As a result, the problems occur that the wiring region occupies a larger area of the surface of the printed wiring board and that a package for the semiconductor integrated circuit should have an increased number of pins.

SUMMARY OF THE INVENTION

It is therefore an object of the present invention to reduce the number of lines required to accomplish differential transmission of each of the plurality of data bits.

To attain the object, the present invention accomplishes differential transmission of each of two data bits via three lines, of which one is a first data line, another is a second data line, and the remaining one is a reference line. When the two data bits to be transmitted have different values, the reference line is not used and the second data line serves as a transmission path complementary to the first data line, while the first data line serves as a transmission path complementary to the second data line. When the two data bits to be transmitted have equal values, a voltage representing a value obtained by inverting each of the first and second data bits is supplied to the reference line such that the reference line serves as a transmission path complementary to each of the first and second data lines.

Specifically, a first data transmission system according to the present invention is a data transmission system for differential transmission of each of first and second data bits, the system comprising: a transmitting unit for transmitting the first and second data bits; a receiving unit for receiving the first and second data bits; and a first data line, a second data line, and a reference line each disposed between the transmitting unit and the receiving unit. Moreover, the transmitting unit has the functions of: when the first and second data bits have different values, supplying a voltage representing the value of the first data bit onto the first data line and a voltage representing the value of the second data bit onto the second data line such that the second data line serves as a transmission path complementary to the first data line and that the first data line serves as a transmission path complementary to the second data line; and when the first and second data bits have equal values, supplying a voltage representing each of the values of the first and second data bits onto each of the first and second data lines and a voltage representing a value obtained by inverting each of the first and second data bits onto the reference line such that the reference line serves as a transmission path complementary to each of the first and second data lines.

To attain the foregoing object, the present invention also accomplishes differential transmission of each of two data bits with three lines of another type. One of the three lines is a first data line, another one thereof is a second data line, and the remaining one thereof is a complementary data line. The voltage representing the value of the first data bit is supplied to the first data line. The voltage representing the value of the second data bit is supplied to the second data line. The voltage representing a value obtained by inverting the first data bit is supplied onto the complementary data line. The first data line and the complementary data line are used for differential transmission of the first data bit. When the first and second data bits have different values, the second and first data lines are used for differential transmission of the second data bit. When the first and second data bits have equal values, the second data line and the complementary data line are used for differential transmission of the second data bit.

Specifically, a second data transmission system according to the present invention is a data transmission system for differential transmission of each of first and second data bits, the system comprising: a transmitting unit for transmitting the first and second data bits; a receiving unit for receiving the first and second data bits; and a first data line, a second data line, and a complementary data line each disposed between the transmitting unit and the receiving unit. Moreover, the transmitting unit has the functions of supplying a voltage representing a value of the first data bit onto the first data line, supplying a value of the second data bit onto the second data line, and supplying a voltage representing a value obtained by inverting the first data bit onto the complementary data line. On the other hand, the receiving unit has the functions of determining the value of the first data bit through a comparison between a voltage on the first data line and a voltage on the complementary data line and determining the value of the second data bit through a comparison between the voltage on the first data line and a voltage on the second data line when the respective voltages on the first and second data lines are different from each other and through a comparison between the voltage on the complementary data line and the voltage on the second data line when the respective voltages on the first and second data lines are equal to each other.

BRIEF DESCRIPTION OF THE DRAWINGS

FIG. 4 shows combinations of respective voltages on the three lines in FIG. 2;

FIG. 13 shows combinations of respective voltages on the three lines in FIG. 11;

FIG. 18 shows combinations of respective voltages on the three lines in FIG. 16;

DETAILED DESCRIPTION OF THE INVENTION

Referring now to the accompanied drawings, the embodiments of the present invention will be described.

Figure 1:
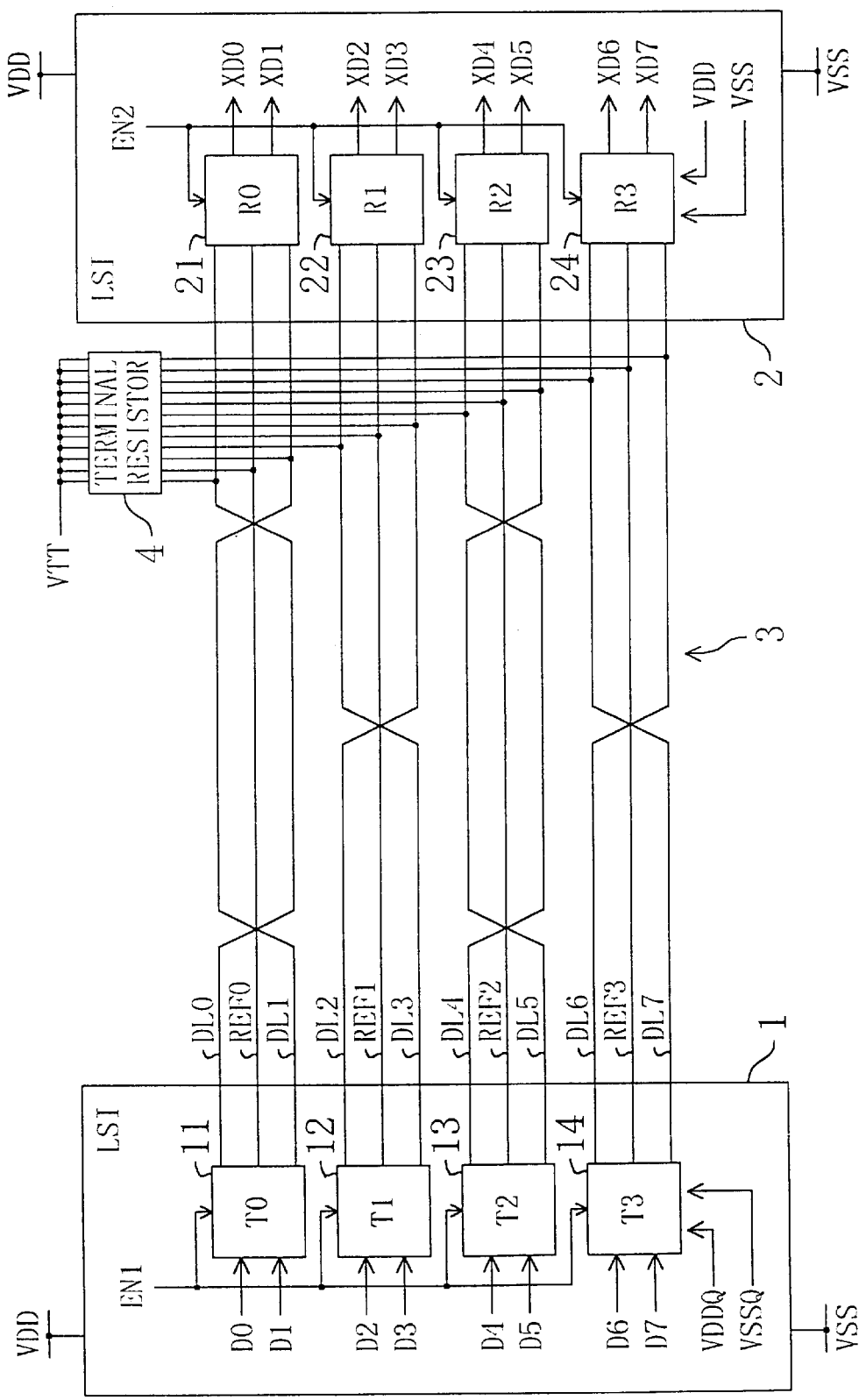
FIG. 1 is a block diagram showing an exemplary structure of a data transmission system according to the present invention.

FIG. 1 shows an exemplary structure of a data transmission system according to the present invention. The system shown in FIG. 1 is composed of two semiconductor integrated circuits mounted on a printed wiring board, e.g., two LSIs (Large Scale Integrated Circuits) 1 and 2 which are connected to each other by a transmission channel 3. The LSI 1 transmits eight data bits D0 to D7 composing a word to the transmission channel 3. The LSI 2 receives the 8-bit word transmitted via the transmission channel 3. Each of the twelve lines composing the transmission channel 3 has been pulled up to a terminal voltage VTT via terminal resistors 4.

The LSI 1 is internally provided with four transmitting units (T0, T1, T2, and T3) 11, 12, 13, and 14 each of which performs a transmitting operation upon activation of an enable signal EN1. The transmitting unit 11 is for transmitting the bits D0 and D1. When the bits D0 and D1 have different values, the transmitting unit 11 supplies a voltage representing the value of the bit D0 onto a data line DL0 and a voltage representing the value of the bit D1 onto a data line DL1 such that the data line DL1 serves as a transmission path complementary to the data line DL0 and that the data line DL0 serves as a path complementary to the data line DL1. When the bit D0 and the bit D1 have equal values, the transmitting unit 11 supplies a voltage representing the value of each of the bits D0 and D1 onto the data lines DL0 and DL1 and a voltage representing a value obtained by inverting the value of each of the bits D0 and D1 onto a reference line REF0. Each of the other three transmitting units 12, 13, and 14 has the same function so that DL2 to DL7 denote data lines and REF1 to REF3 denote reference lines. It is to be noted that power source voltages VDDQ and VSSQ produced within the LSI 1 from external voltages VDD and VSS are supplied to the output stage of each of the four transmitting units 11 to 14.

The data lines DL0 and DL1 have been twisted twice around the reference line REF0 to compose a twisted pair of lines. The twists have been imparted to respective portions corresponding to ⅓ and ⅔ of the entire lengths of the data lines DL0 and DL1. The data lines DL2 and DL3 have been twisted once around the reference line REF1 to compose another twisted pair of lines. The twist has been imparted to respective portions corresponding to ½ of the entire lengths of the data lines DL2 and DL3. As a result, the data lines DL2 and DL3 are equally influenced by the data lines DL0 and DL1, while the data lines DL0 and DL1 are equally influenced by the data lines DL2 and DL3 by counteraction. The reference line REF1 is shielded by the data lines DL2 and DL3, while the reference line REF0 is shielded by the data lines DL0 and DL1. Likewise, the data lines DL4 and DL5 have been twisted twice around the reference line REF2 to form a twisted pair, while the data lines DL6 and DL7 have been twisted once around the reference line REF3 to form another twisted pair. The numbers of twists are not limited to the foregoing example.

The LSI 2 is internally provided with four receiving units (R0, R1, R2, and R3) 21, 22, 23, and 24 corresponding to the four transmitting units 11, 12, 13, and 14, respectively. Each of the four receiving units 21 to 24 performs a receiving operation upon activation of an enable signal EN2. The receiving unit 21 is for receiving the bits D0 and D1. When the respective voltages on the data lines DL0 and DL1 are different from each other, the receiving unit 21 determines the respective values of the bits D0 and D1 through a comparison between the respective voltages on the data lines DL0 and DL1. When the respective voltages on the data lines DL0 and DL1 are equal to each other, the receiving unit 21 determines the value of the bit D0 through a comparison between the respective voltages on the data line DL0 and on the reference line REF0, while determining the value of the bit D1 through a comparison between the respective voltages on the data line DL1 and on the reference line REF0. Each of the other three receiving units 22, 23, and 24 has the same function. In the drawing, XD0 to XD7 denote respective bits obtained by inverting the bits D0 to D7. An inverse relationship is established between the arrangement of the output terminals of the transmitting unit 12 and the arrangement of the input terminals of the receiving unit 22 since the data lines DL2 and DL3 have been twisted an odd number of times. The same relationship is established between the transmitting unit 14 and the receiving unit 24.

Figure 2:
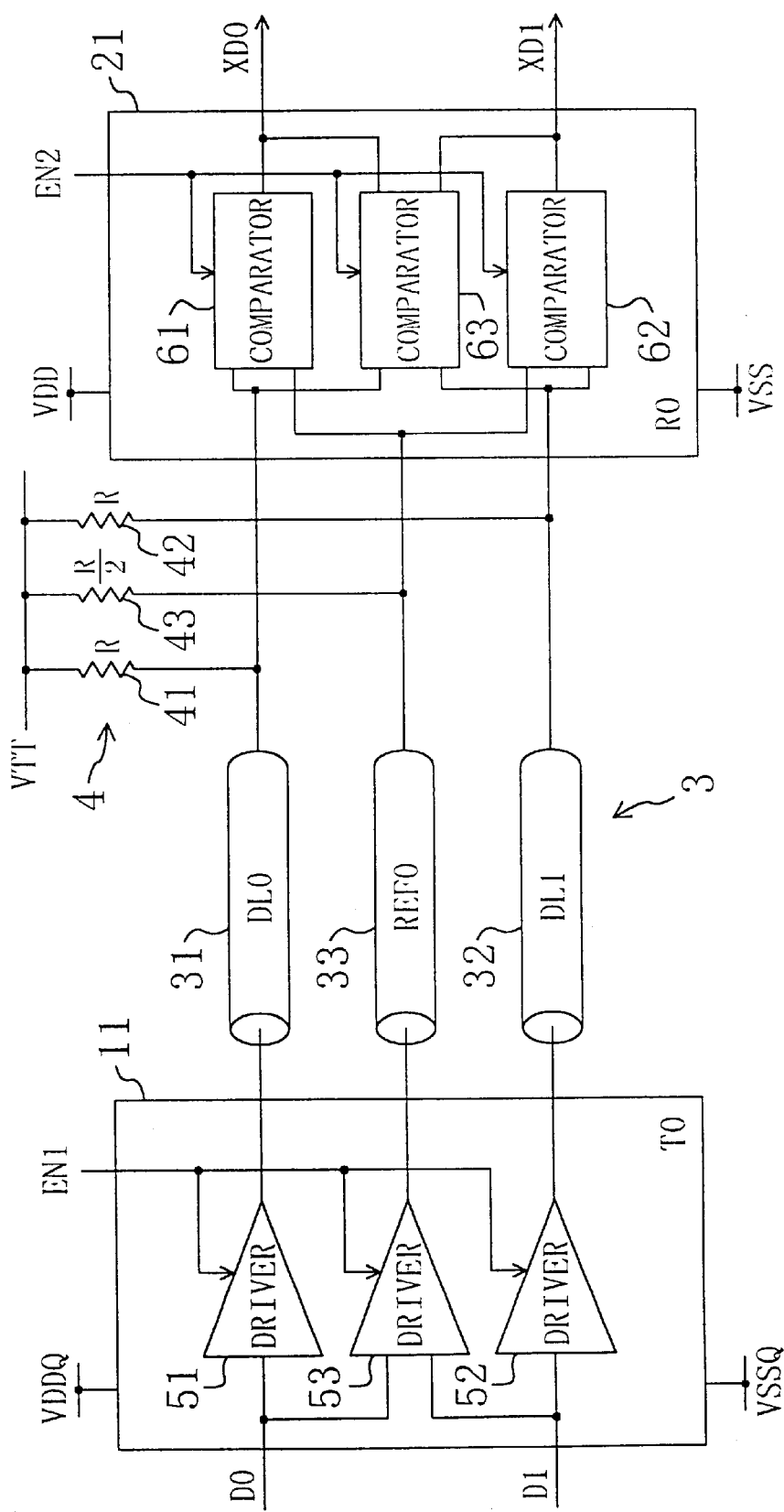
FIG. 2 is a block diagram showing in detail the respective structures of one transmitting unit and one receiving unit in FIG. 1.

FIG. 2 shows in detail the respective structures of one transmitting unit 11 and one receiving unit 21 in FIG. 1. It is to be noted that the twists imparted to the data lines DL0 and DL1 are not depicted herein.

As shown in FIG. 2, the transmitting unit 11 has first, second, and third drivers 51, 52, and 53 each of which performs a transmitting operation upon activation of the enable signal EN1. The first driver 51 is for supplying a voltage representing the value of the bit D0 onto the data line (DL0) 31. The second driver 52 is for supplying a voltage representing the value of the bit D1 onto the data line (DL1) 32. The third driver 53 has means for supplying a voltage representing a value obtained by inverting each of the bits D0 and D1 to the reference line (REF0) 33 when the bits D0 and D1 have equal values and holding an output from the third driver 53 to the reference line (REF0) 33 in a high-impedance state when the bits D0 and D1 have different values.

The data lines DL0 and DL1 and the reference line REF0 have been pulled up to the terminal voltage VTT via the respective terminal resistors 41, 42, and 43. Of the three terminal resistors, each of the two terminal resistors 41 and 42 for pulling up the data lines DL0 and DL1, respectively, has a resistance value R and the other terminal resistor 43 for pulling up the reference line REF0 has a resistance value R/2.

The receiving unit 21 has first, second, and third comparators 61, 62, and 63 each of which performs a receiving operation upon activation of the enable signal EN2. The first comparator 61 is for performing a comparison between the respective voltages on the data line DL0 and on the reference line REF0. The second comparator 62 is for performing a comparison between the respective voltages on the data line DL1 and on the reference line REF0. The third comparator 63 is for performing a comparison between the respective voltages on the data lines DL0 and DL1. When the respective voltages on the data lines DL0 and DL1 are different from each other, the third comparator 63 determines the respective values of the bits D0 and D1. When the respective voltages on the data lines DL0 and DL1 are equal to each other, the first comparator 61 determines the value of the bit D0 and the second comparator 62 determines the value of the bit D1.

Figure 3:
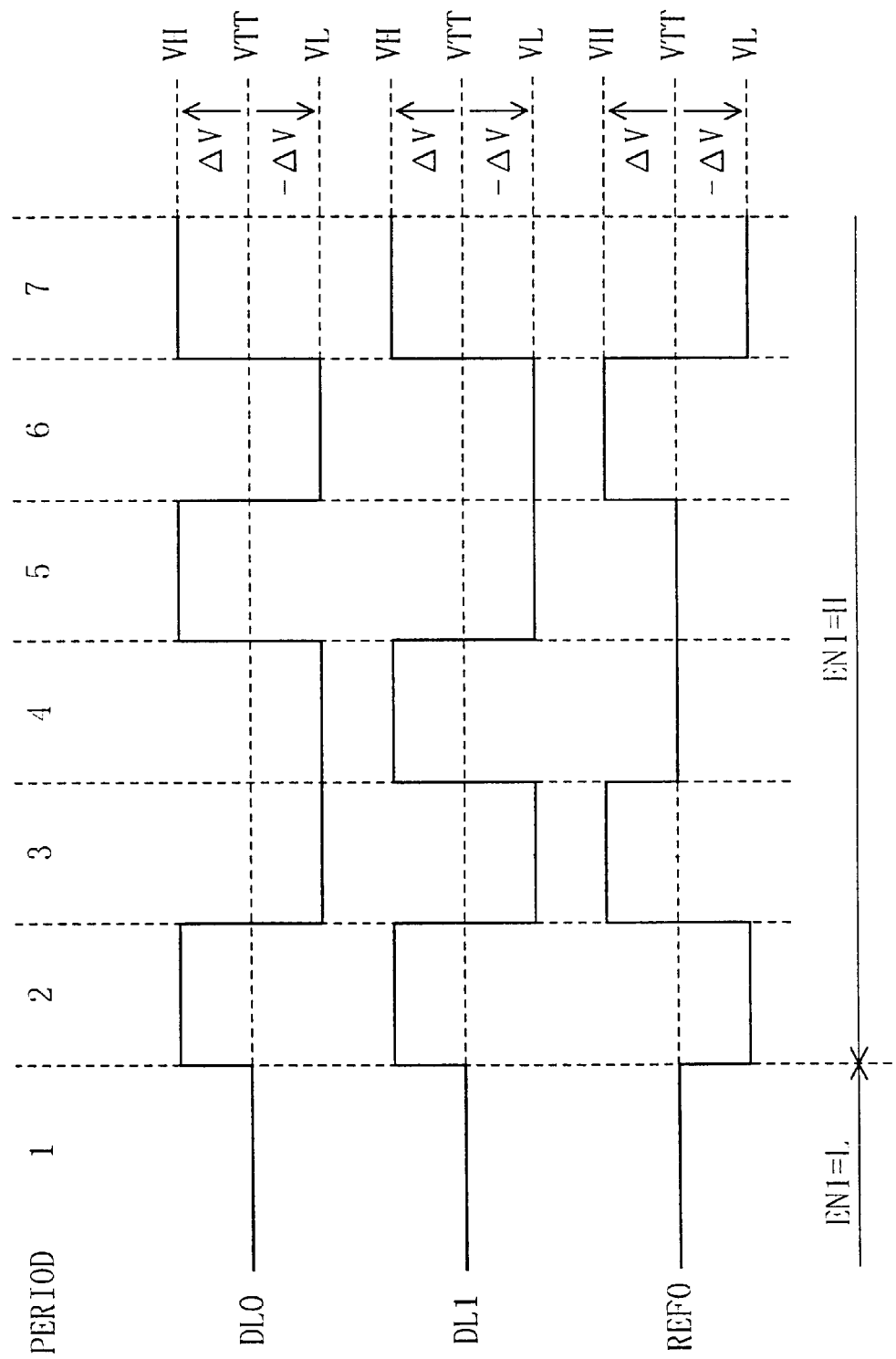
FIG. 3 is a timing chart illustrating an example of respective voltage variations on the three lines in FIG. 2.
Figure 5B:
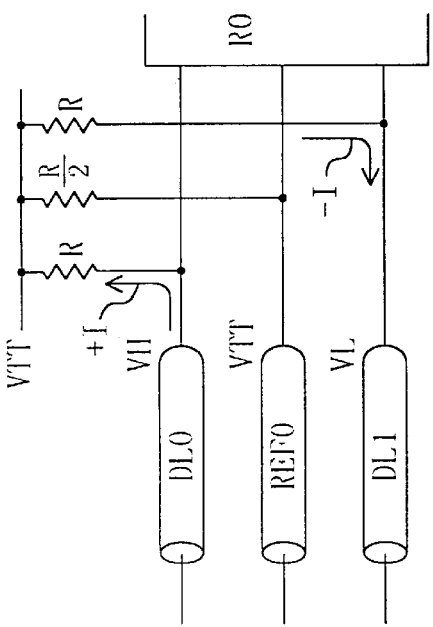
FIGS. 5A, 5B, 5C, and 5D show combinations of respective currents flowing through the three lines in FIG. 2.
Figure 5D:
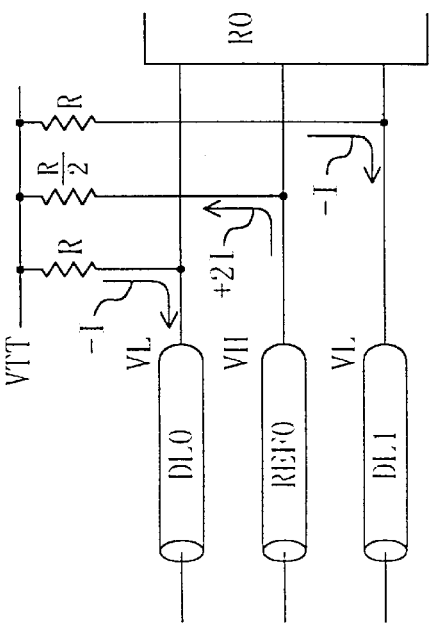
Figure 5A:
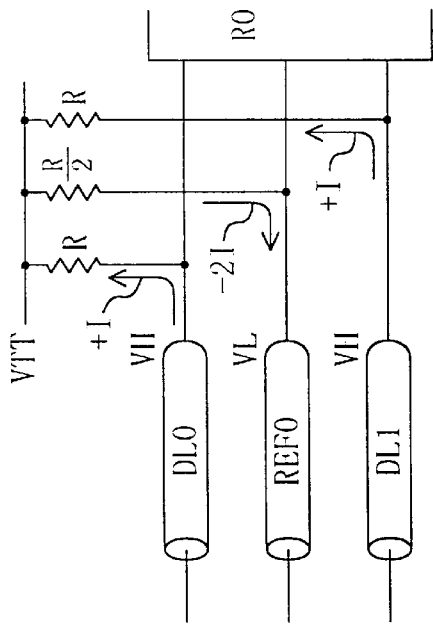
Figure 5C:
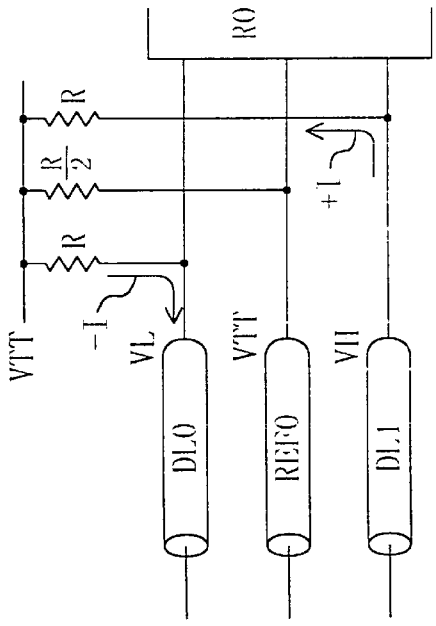

FIG. 3 shows an example of respective voltage variations on the three lines DL0, DL1, and REF0 in FIG. 2. During PERIOD 1, the enable signal EN1 is set to an inactivation level "L", so that the first, second, and third drivers 51, 52, and 53 hold the respective outputs thereof in the high-impedance state. Consequently, each of the voltages on the three lines DL0, DL1, and REF0 becomes equal to the terminal voltage VTT. During PERIODS 2 to 7, the setting of the enable signal EN1 is changed to an activation level "H", so that each of the first, second, and third drivers 51, 52, and 53 performs the transmitting operation responsive to the data bits D0 and D1. During PERIOD 2, D0=1 and D1=1 are satisfied. Accordingly, the respective voltages on the data lines DL0 and DL1 become a high-level voltage VH representing a bit value 1 during PERIOD 2, while the voltage on the reference line REF0 becomes a low-level voltage VL. The voltage VH is higher than the terminal voltage VTT by ΔV, while the voltage VL is lower than the terminal voltage VTT by ΔV. During PERIOD 3, D0=0 and D1=0 are satisfied. Accordingly, each of the voltages on the data lines DL0 and DL1 becomes the low-level voltage VL representing a bit value 0 during PERIOD 3, while the voltage on the reference line REF0 becomes the high-level voltage VH representing the bit value 1. During PERIOD 4, D0=0 and D1=1 are satisfied. During PERIOD 5, D0=1 and D1=0 are satisfied. Since the output of the third driver 53 is in the high-impedance state during PERIODS 4 and 5, the voltage on the reference line REF0 becomes equal to the terminal voltage VTT. The state during PERIOD 6 is the same as in PERIOD 3 and the state during PERIOD 7 is the same as in PERIOD 2. Thus, each of the amplitudes of the respective voltages on the three lines DL0, DL1, and REF0 is 2 ΔV. When VDD=+3.3 V, VSS=0 V, and VTT=+1.5 V are satisfied, for example, ΔV=0.4 V (output value of the transmitting unit 11) is satisfied. The use of such a low-amplitude interface enables high-speed data transmission.

FIG. 4 shows combinations of respective voltages on the three lines DL0, DL1, and REF0 in FIG. 2. Respective currents flowing through the lines are enclosed in the parentheses. As shown in FIG. 4, when each of the voltages on the data lines DL0 and DL1 is the high-level voltage VH, the voltage on the reference line REF0 is the low-level voltage VL and the magnitude of the current (−2I) flowing onto the reference line REF0 is double the magnitude of the current (+I) flowing out of each of the data lines DL0 and DL1. When the voltage on the data line DL0 is the high-level voltage VH and the voltage on the data line DL1 is the low-level voltage VL, the voltage on the reference line REF0 is the terminal voltage VTT and the magnitude of the current (+I) flowing out of the data line DL0 is equal to the magnitude of the current (−I) flowing onto the data line DL1. When the voltage on the data line DL0 is the low-level voltage VL and the voltage on the data line DL1 is the high-level voltage VH, the voltage on the reference line REF0 is the terminal voltage VTT and the magnitude of the current (−I) flowing onto the data line DL0 is equal to the magnitude of the current (+I) flowing out of the data line DL1. When each of the voltages on the data lines DL0 and DL1 is the low-level voltage VL, the voltage on the reference line REF0 is the high-level voltage VH and the magnitude of the current (+2I) flowing out of the reference line REF0 is double the magnitude of the current (−I) flowing onto each of the data lines DL0 and DL1.

FIGS. 5A to 5D show combinations of respective currents flowing through the three lines DL0, DL1, and REF0 in FIG. 2. As stated previously, the resistance value (R/2) of the terminal resistor for pulling up the reference line REF0 has been adjusted to ½ of the resistance value (R) of each of the terminal resistors for pulling up the respective data lines DL0 and DL1 such that the current flowing through the reference line REF0 is double the current flowing through each of the data lines DL0 and DL1. As will be understood from FIGS. 5A to 5D, the sum of the current flowing into the power source for supplying the terminal voltage VTT and the current flowing out thereof is constantly 0.

A description will be given below to the respective internal structures of the transmitting unit 11 and the receiving unit 21 in FIG. 2.

Figure 6:
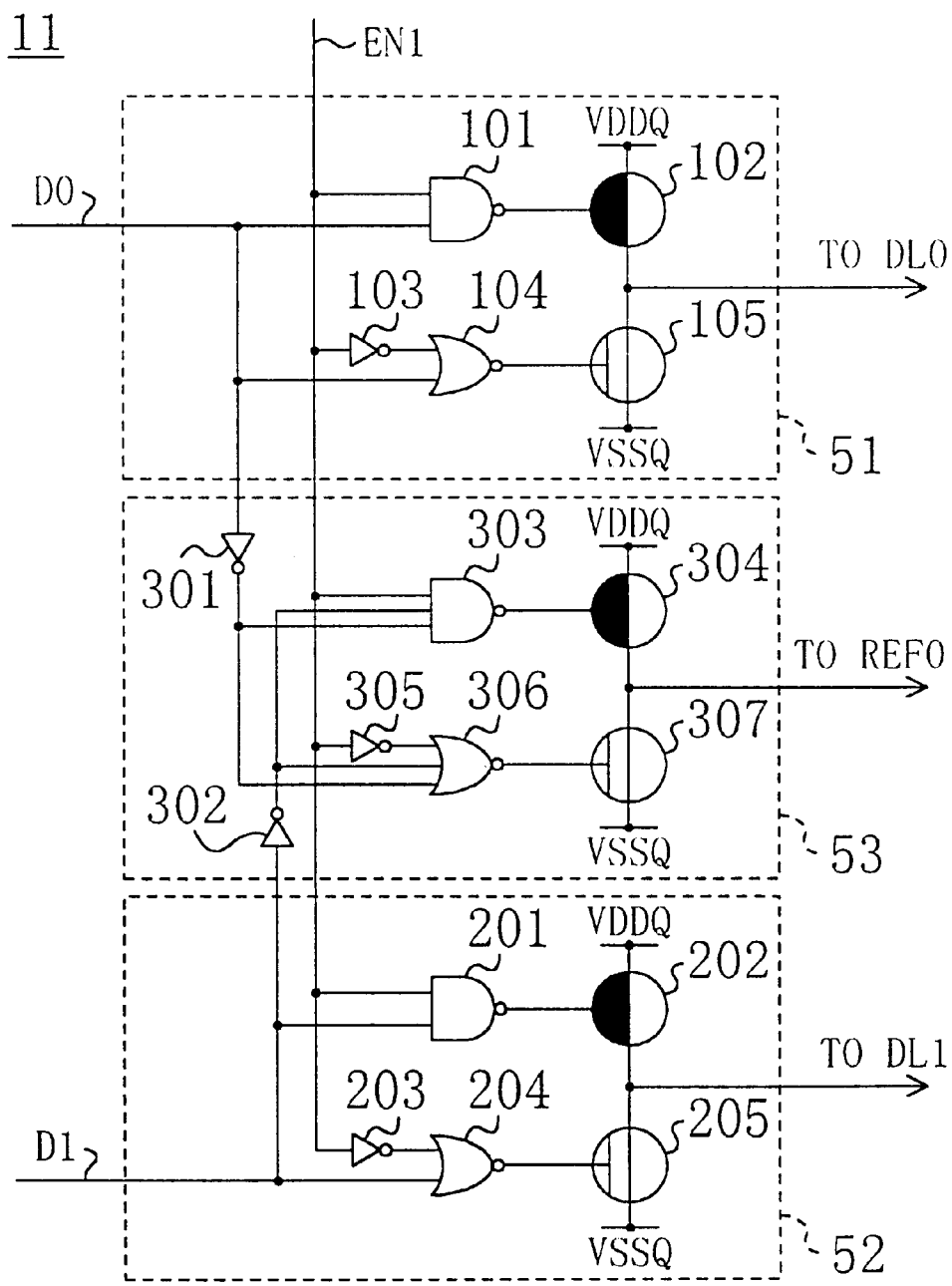
FIG. 6 is a detailed circuit diagram showing an exemplary structure of the transmitting unit in FIG. 2.

FIG. 6 shows an exemplary structure of the transmitting unit 11 in FIG. 2. The first driver 51 for driving the data line DL0 is composed of: a NAND gate 101; a PMOS transistor 102; an inverter 103; a NOR gate 104; and an NMOS transistor 105 and receives the data bit D0 and the enable signal EN1. The second driver 52 for driving the data line DL1 is composed of: a NAND gate 201; a PMOS transistor 202; an inverter 203; a NOR gate 204; and an NMOS transistor 205 and receives the data bit D1 and the enable signal EN1. The third driver 53 for driving the reference line REF0 is composed of: two inverters 301 and 302; a NAND gate 303; a PMOS transistor 304; an inverter 305; a NOR gate 306; and an NMOS transistor 307 and receives the two data bits D0 and D1 and the enable signal EN1.

Figure 7:
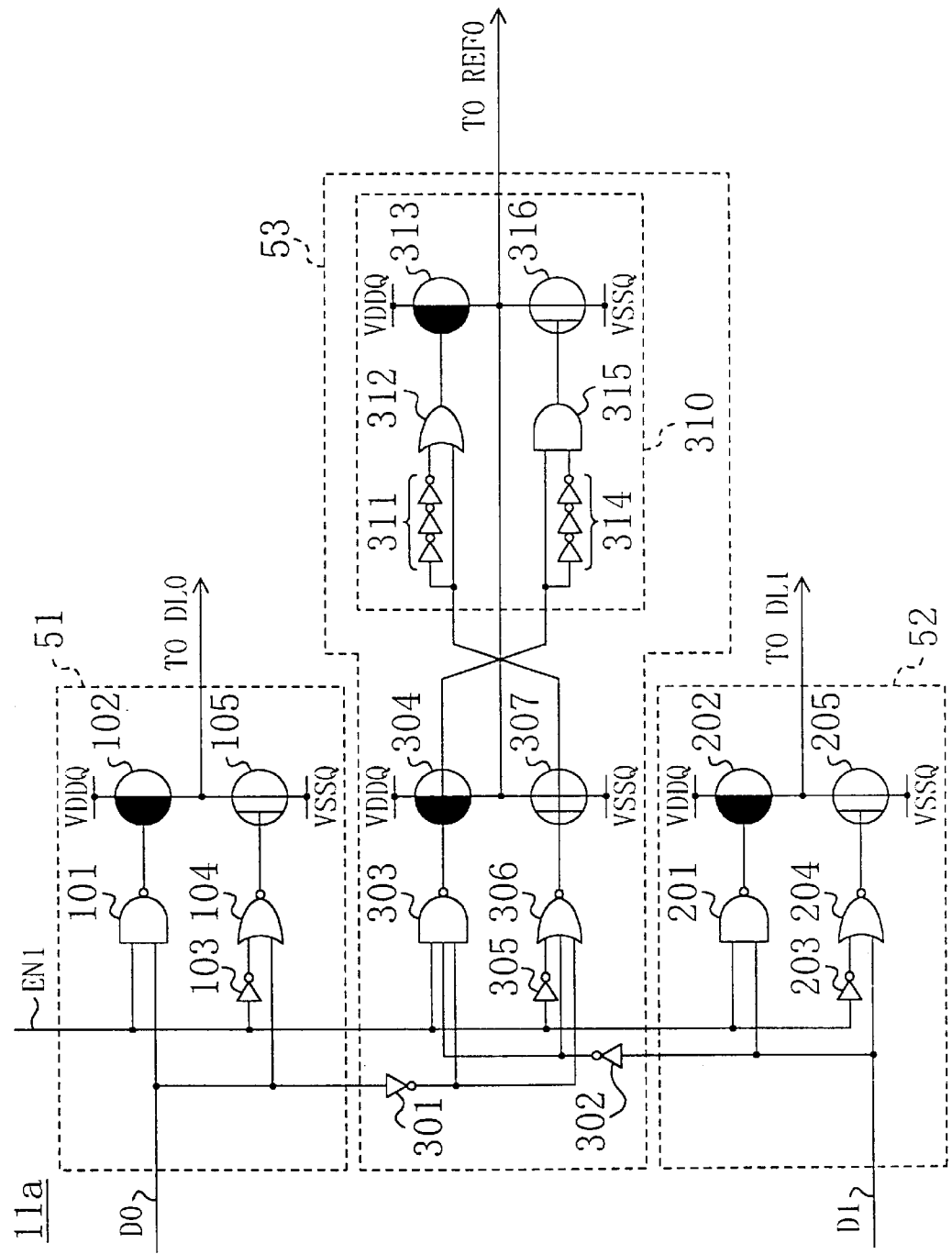
FIG. 7 is a detailed circuit diagram showing a variation of the transmitting unit of FIG. 6.

FIG. 7 shows a variation of the transmitting unit 11 of FIG. 6. A transmitting unit 11a of FIG. 7 is obtained by adding a transition accelerating circuit 310 to the third driver 53 in the transmitting unit 11 of FIG. 6. The transition accelerating circuit 310 is composed of: a first delay circuit 311 consisting of an odd number of inverters; an OR gate 312; a PMOS transistor 313; a second delay circuit 314 consisting of an odd number of inverters; an AND gate 315; and an NMOS transistor 316. The transition accelerating circuit 310 has the functions of supplying the voltage (VL) representing the bit value 0 to the reference line REF0 only during a specified period of time when the reference line REF0 undergoes a transition from the voltage (VH) representing the bit value 1 to another voltage (VL or VTT) and supplying the voltage (VH) representing the bit value 1 to the reference line REF0 only during a specified period of time when the reference line REF0 undergoes a transition from the voltage (VL) representing the bit value 0 to another voltage (VH or VTT). This advantageously accelerates the voltage transitions on the reference line REF0.

Figure 8:
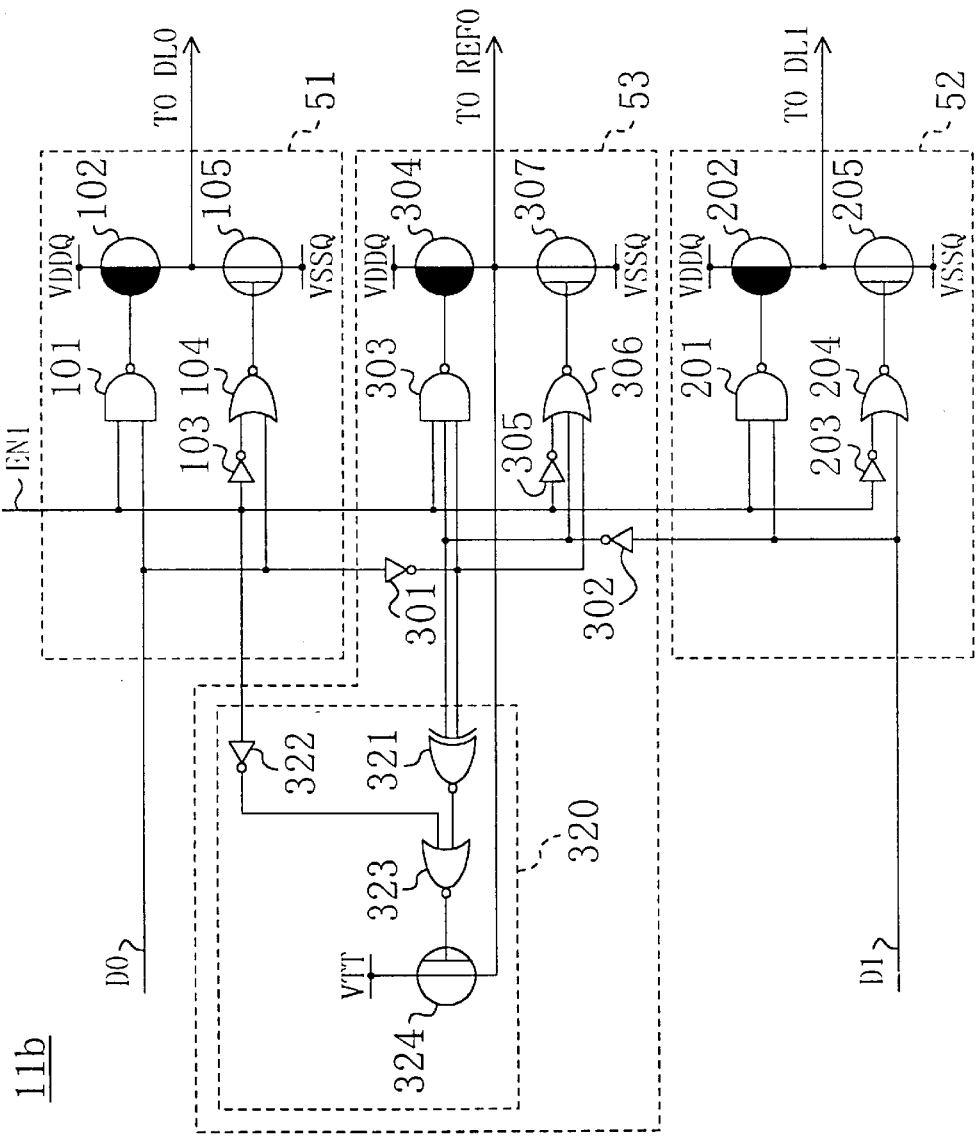
FIG. 8 is a detailed circuit diagram showing another variation of the transmitting unit of FIG. 6.

FIG. 8 shows another variation of the transmitting unit 11. A transmitting unit 11b of FIG. 8 is obtained by adding a voltage initializing circuit 320 to the third driver 53 in the transmitting unit 11 of FIG. 6. The voltage initializing circuit 320 is composed of: an exclusive OR gate 321; an inverter 322; a NOR gate 323; and an NMOS transistor 324. The transmitting unit 11b has the function of supplying a mean voltage of the voltage (VL) representing the bit value 0 and the voltage (VH) representing the bit value 1, i.e., the terminal voltage VTT to the reference line REF0 when the enable signal EN1 is set to the activation level "H" and the data bits D0 and D1 have different values. This advantageously promotes the establishment of the terminal voltage VTT on the reference line REF0 in the case where neither the voltage (VH) representing the bit value 1 nor the voltage (VL) representing the bit value 0 is supplied to the reference line REF0. Optionally, the transition accelerating circuit 310 in FIG. 7 may be added to the third driver 53 in the transmitting unit 11b in FIG. 8.

Figure 9:
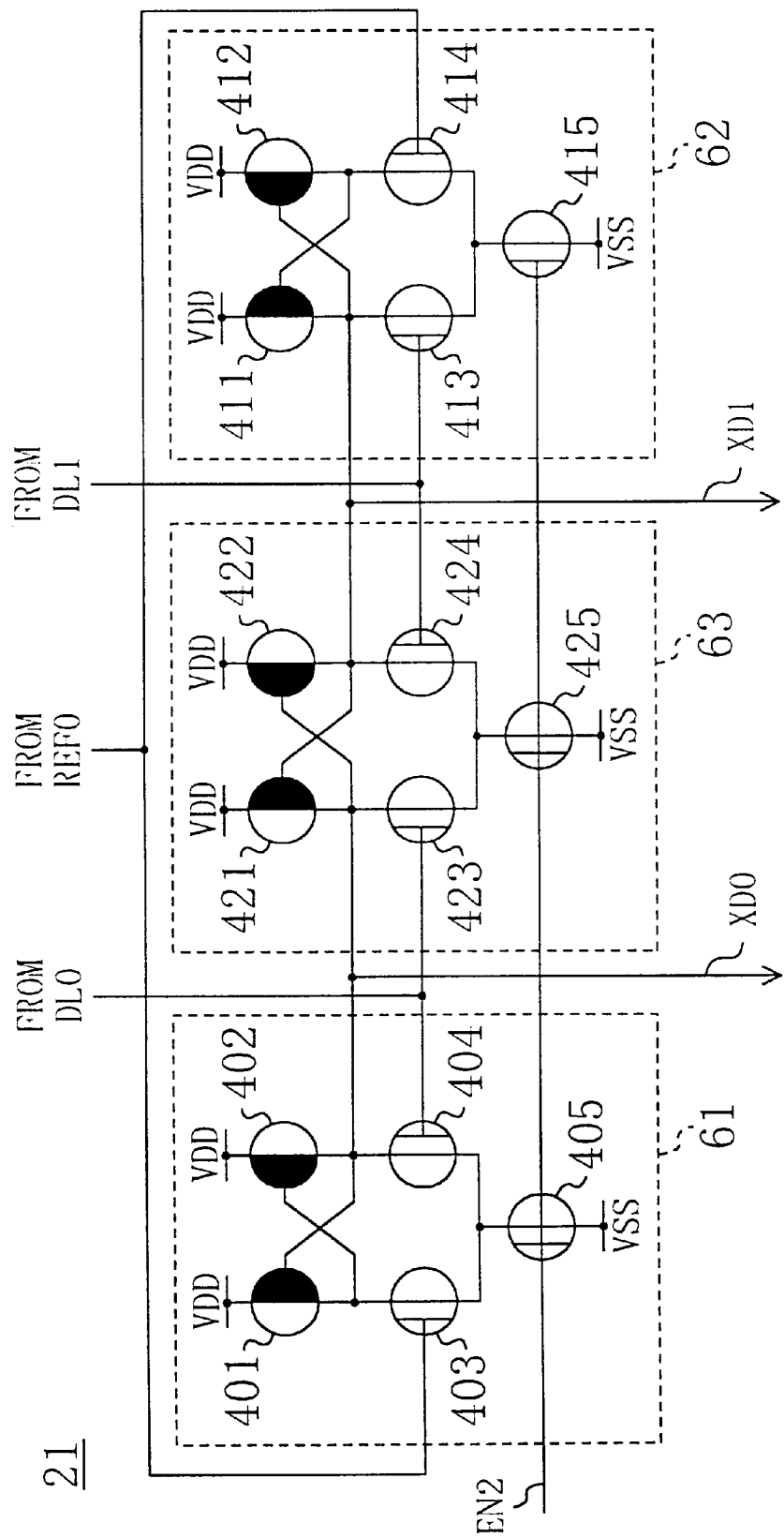
FIG. 9 is a detailed circuit diagram showing an exemplary structure of the receiving unit in FIG. 2.

FIG. 9 shows an exemplary structure of the receiving unit 21 in FIG. 2. The first comparator 61 for performing a comparison between the respective voltages on the data line DL0 and on the reference line REF0 is composed of: two PMOS transistors 401 and 402; and three NMOS transistors 403, 404, and 405. The second comparator 62 for performing a comparison between the respective voltages on the data line DL1 and on the reference line REF0 is composed of: two PMOS transistors 411 and 412; and three NMOS transistors 413, 414, and 415. The third comparator 63 for performing a comparison between the respective voltages on the data lines DL0 and DL1 is composed of: two PMOS transistors 421 and 422; and three NMOS transistors 423, 424, and 425. Each of the first, second, and third comparators 61, 62, and 63 is a circuit excellent in common-mode noise rejecting performance. A wired OR connection is provided between an output of the first comparator 61 and one output of the third comparator 63 to determine the data bit XD0 (bit obtained by inverting the bit D0). Another wired OR connection is provided between an output of the second comparator 62 and the other output of the third comparator 63 to determine the data bit XD1 (bit obtained by inverting the bit D1). Therefore, the third comparator 63 determines the respective values of the bits XD0 and XD1 when the respective voltages on the data lines DL0 and DL1 are different from each other. On the other hand, the first comparator 61 determines the value of the bit XD0 and the second comparator 62 determines the value of the bit XD1 when the respective voltages on the data lines DL0 and DL1 are equal to each other.

It is to be noted that the provision of the terminal resistors 4 in FIG. 1, i.e., the three terminal resistors 41, 42, and 43 in FIG. 2 can be omitted. When the terminal resistors 41, 42, and 43 are not provided, the reference line REF0 is brought into a floating state when the bit D0 and the bit D1 have different values. In this case also, the structure shown in FIG. 9 enables correct determination of the respective values of the bits XD0 and XD1 by means of the third comparator 63.

Figure 10:
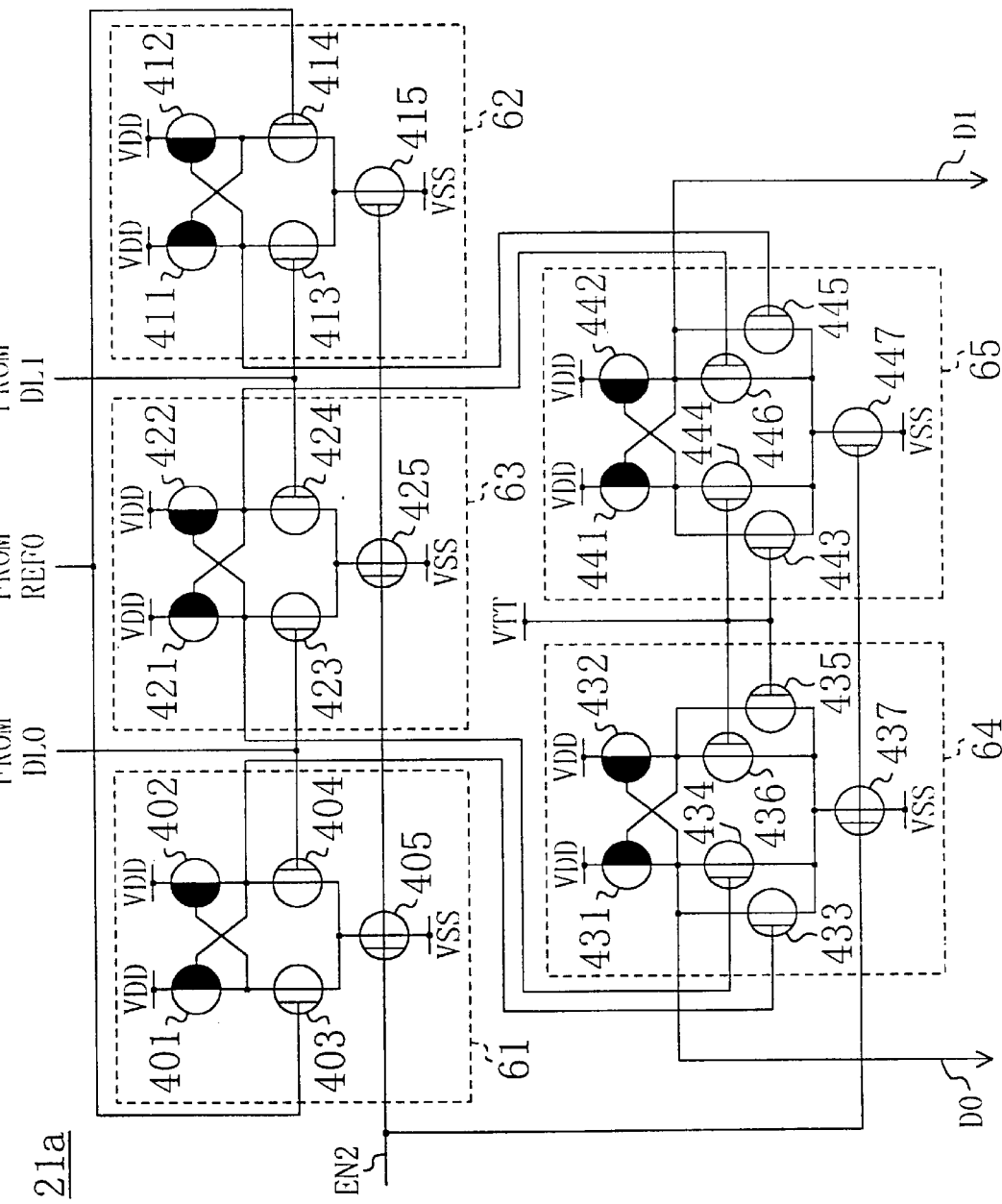
FIG. 10 is a detailed circuit diagram showing a variation of the receiving unit of FIG. 9.

FIG. 10 shows a variation of the receiving unit 21 of FIG. 9. A receiving unit 21a of FIG. 10 has: a fourth comparator 64 for determining the value of the bit D0 based on the respective results of comparisons obtained from the first and third comparators 61 and 63; and a fifth comparator 65 for determining the value of the bit D1 based on the respective results of comparisons obtained from the second and third comparators 62 and 63. The fourth comparator 64 is composed of two PMOS transistors 431 and 432 and five NMOS transistors 433, 434, 435, 436, and 437 and determines the value of the bit D0 through a comparison between an output voltage of the first comparator 61 and the terminal voltage VTT and a comparison between one output voltage of the third comparator 63 and the terminal voltage VTT. The fifth comparator 65 is composed of two PMOS transistors 441 and 442 and five NMOS transistors 443, 444, 445, 446, and 447 and determines the value of the bit D1 through a comparison between an output voltage of the second comparator 62 and the terminal voltage VTT and a comparison between the other output voltage of the third comparator 63 and the terminal voltage VTT. The structure shown in FIG. 10 enables more ensured determination of the bit values than in the case shown in FIG. 9.

Figure 11:
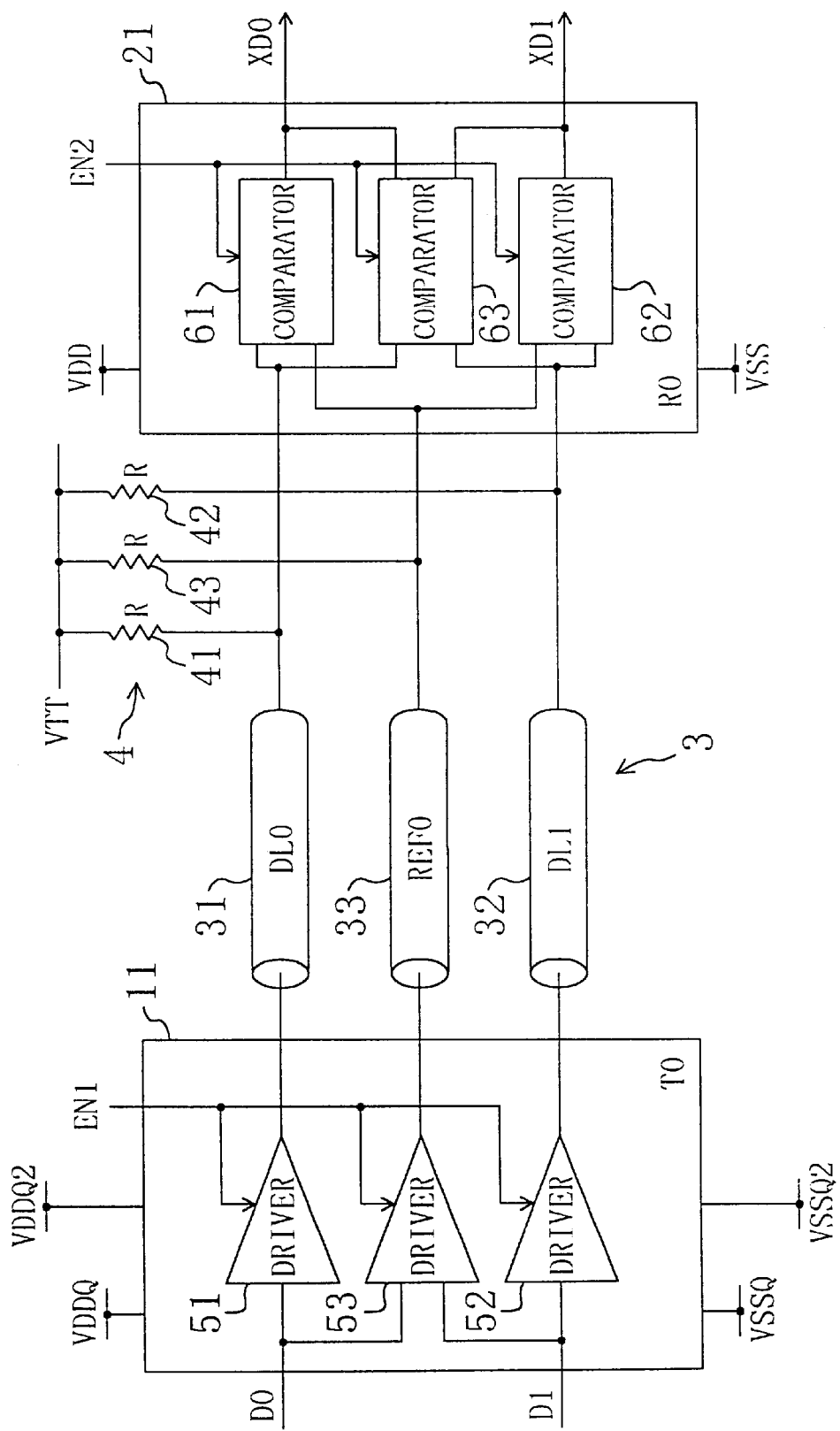
FIG. 11 is a block diagram showing a variation of FIG. 2.

FIG. 11 shows a variation of FIG. 2. As shown in FIG. 11, power source voltages VDDQ2 and VSSQ2 different from the foregoing power source voltages VDDQ and VSSQ are supplied to the output stage of the third driver 53. In other words, the third driver 53 in FIG. 11 is for determining a voltage supplied to the reference line REF0 such that the amplitude of the voltage on the reference line REF0 is double the amplitude of the voltage on each of the data lines DL0 and DL1. Each of the terminal resistors 41, 42, and 43 for pulling up the data lines DL0 and DL1 and the reference line REF0, respectively, has the resistance value R.

Figure 12:
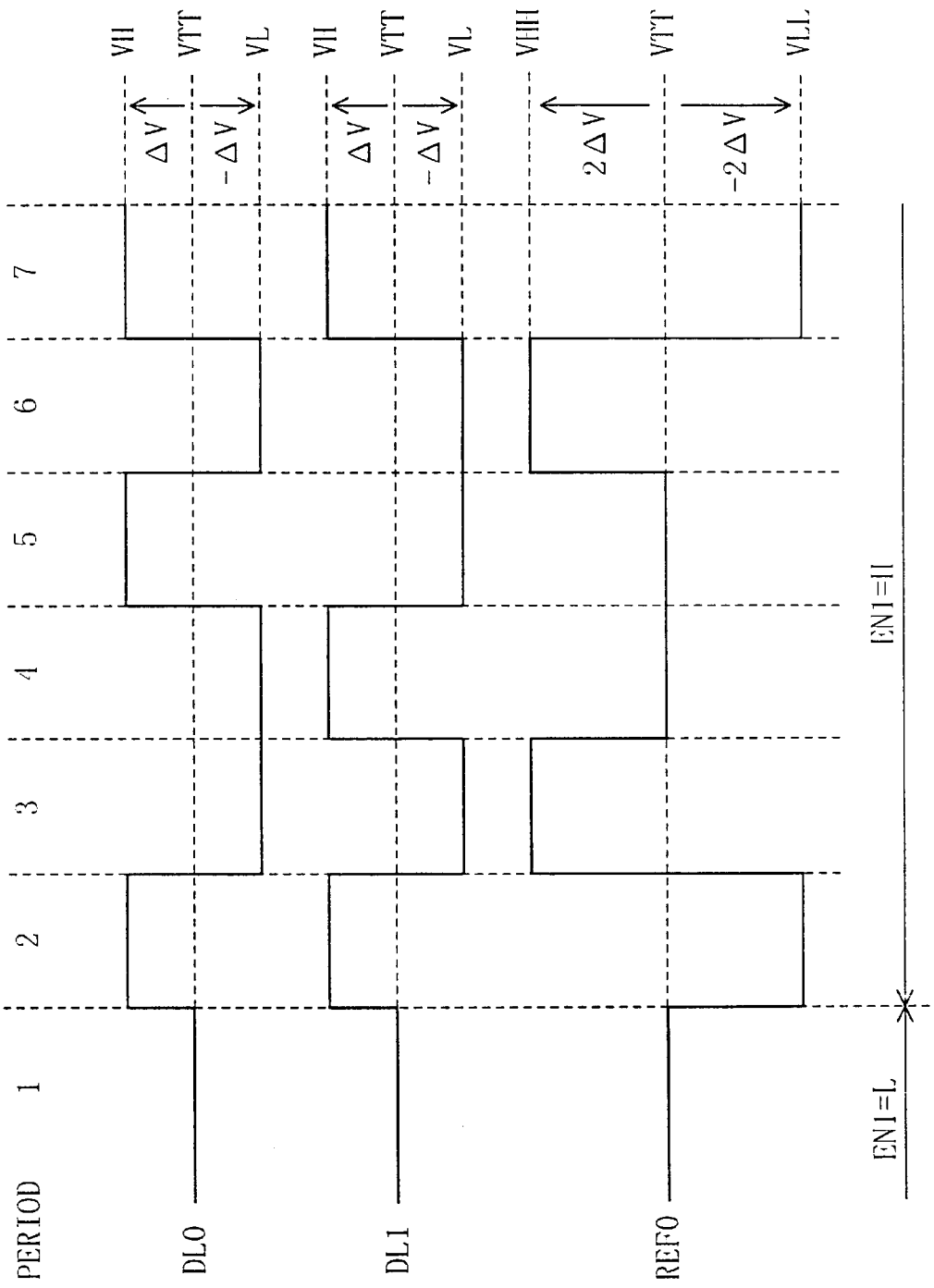
FIG. 12 is a timing chart showing an example of respective voltage variations on the three lines in FIG. 11.
Figure 14B:
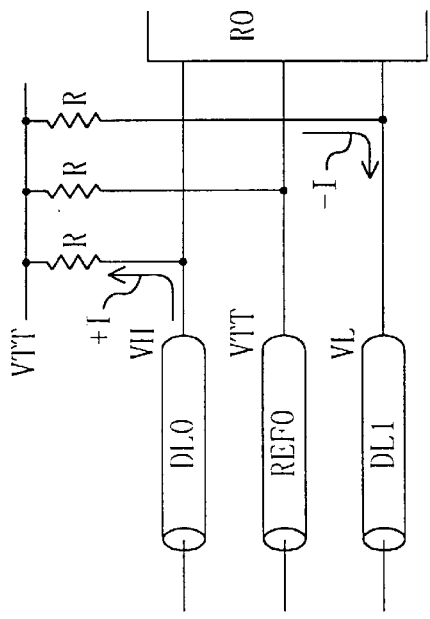
FIGS. 14A, 14B, 14C, and 14D show combinations of respective currents flowing through the three lines in FIG. 11.
Figure 14D:
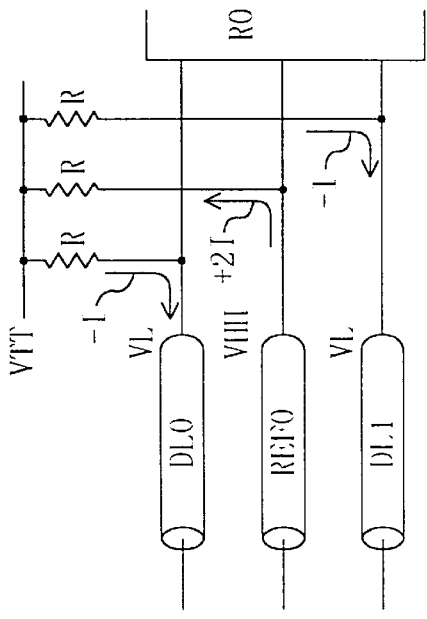
Figure 14A:
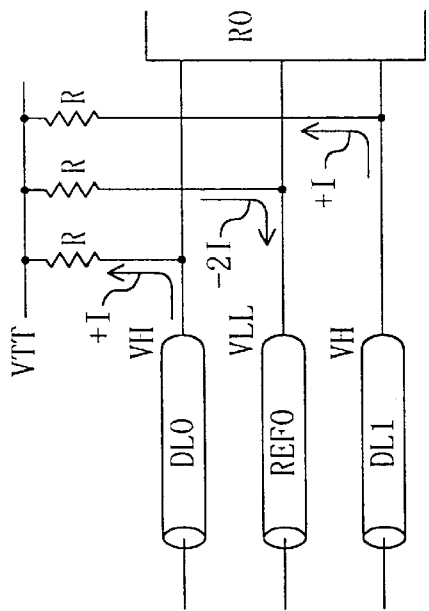
Figure 14C:
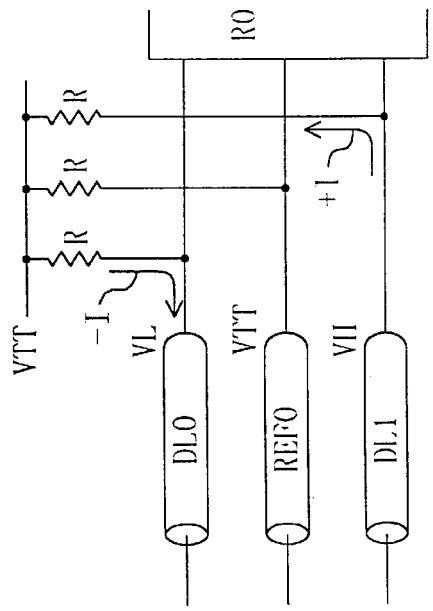

FIG. 12 shows an example of respective voltage variations on the three lines DL0, DL1, and REF0. During PERIOD 2, D0=1 and D1=1 are satisfied. Accordingly, each of the respective voltages on the data lines DL0 and DL1 becomes the high-level voltage VH representing the bit value 1 during PERIOD 2, while the voltage on the reference line REF0 becomes a low-level voltage VLL representing the bit value 0. The voltage VH is higher than the terminal voltage VTT by ΔV and the voltage VLL is lower than the terminal voltage VTT by 2ΔV. During PERIOD 3, D0=0 and D1=0 are satisfied. Accordingly, each of the respective voltages on the data lines DL0 and DL1 becomes the low-level voltage VL representing the bit value 0 during PERIOD 3, while the voltage on the reference line REF0 becomes a high-level voltage VHH representing the bit value 1. The voltage VL is lower than the terminal voltage VTT by ΔV and the voltage VHH is higher than the terminal voltage VTT by 2ΔV. During PERIOD 4, D0=0 and D1=1 are satisfied. During PERIOD 5, D0=1 and D1=0 are satisfied. Accordingly, the output of the third driver 53 is brought into a high impedance state during PERIODS 4 and 5 so that the voltage on the reference line REF0 becomes equal to the terminal voltage VTT. The state during PERIOD 6 is the same as in PERIOD 3 and the state during PERIOD 7 is the same as in PERIOD 2. Thus, the amplitude of the voltage on the reference line REF0 is 4ΔV, while the amplitude of each of the voltages on the data lines DL0 and DL1 is 2ΔV. Hence, the sum of the respective voltage variations on the three lines DL0, DL1, and REF0 is constantly 0 in any period, which is advantageous in the case where a voltage equalization mechanism (not shown) for the three lines is provided.

FIG. 13 shows combinations of respective voltages on the three lines DL0, DL1, and REF0 in FIG. 11. Respective currents flowing through the lines are enclosed in the parentheses. As shown in FIG. 13, when each of the voltages on the data lines DL0 and DL1 is the high-level voltage VH, the voltage on the reference line REF0 is the low-level voltage VLL and the magnitude of the current (−2I) flowing onto the reference line REF0 is double the magnitude of the current (+I) flowing out of each of the data lines DL0 and DL1. When the voltage on the data line DL0 is the high-level voltage VH and the voltage on the data line DL1 is the low-level voltage VL, the voltage on the reference line REF0 is the terminal voltage VTT and the magnitude of the current (+I) flowing out of the data line DL0 is equal to the magnitude of the current (−I) flowing onto the data line DL1. When the voltage on the data line DL0 is the low-level voltage VL and the voltage on the data line DL1 is the high-level voltage VH, the voltage on the reference line REF0 is the terminal voltage VTT and the magnitude of the current (−I) flowing onto the data line DL0 is equal to the magnitude of the current (+I) flowing out of the data line DL1. When each of the voltages on the data lines DL0 and DL1 is the low-level voltage VL, the voltage on the reference line REF0 is the high-level voltage VHH and the magnitude of the current (+2I) flowing out of the reference line REF0 is double the magnitude of the current (−I) flowing onto each of the data lines DL0 and DL1.

FIGS. 14A to 14D show combinations of respective currents flowing through the three lines DL0, DL1, and REF0 in FIG. 11. As stated previously, the resistance value (R) of the terminal resistor for pulling up the reference line REF0 has been adjusted to be equal to the resistance value (R) of each of the terminal resistors for pulling up the respective data lines DL0 and DL1 such that the current flowing through the reference line REF0 is double the current flowing through each of the data lines DL0 and DL1. As will be understood from FIGS. 14A to 14D, the sum of the current flowing into the power source for supplying the terminal voltage VTT and the current flowing out thereof is constantly 0.

Figure 15:
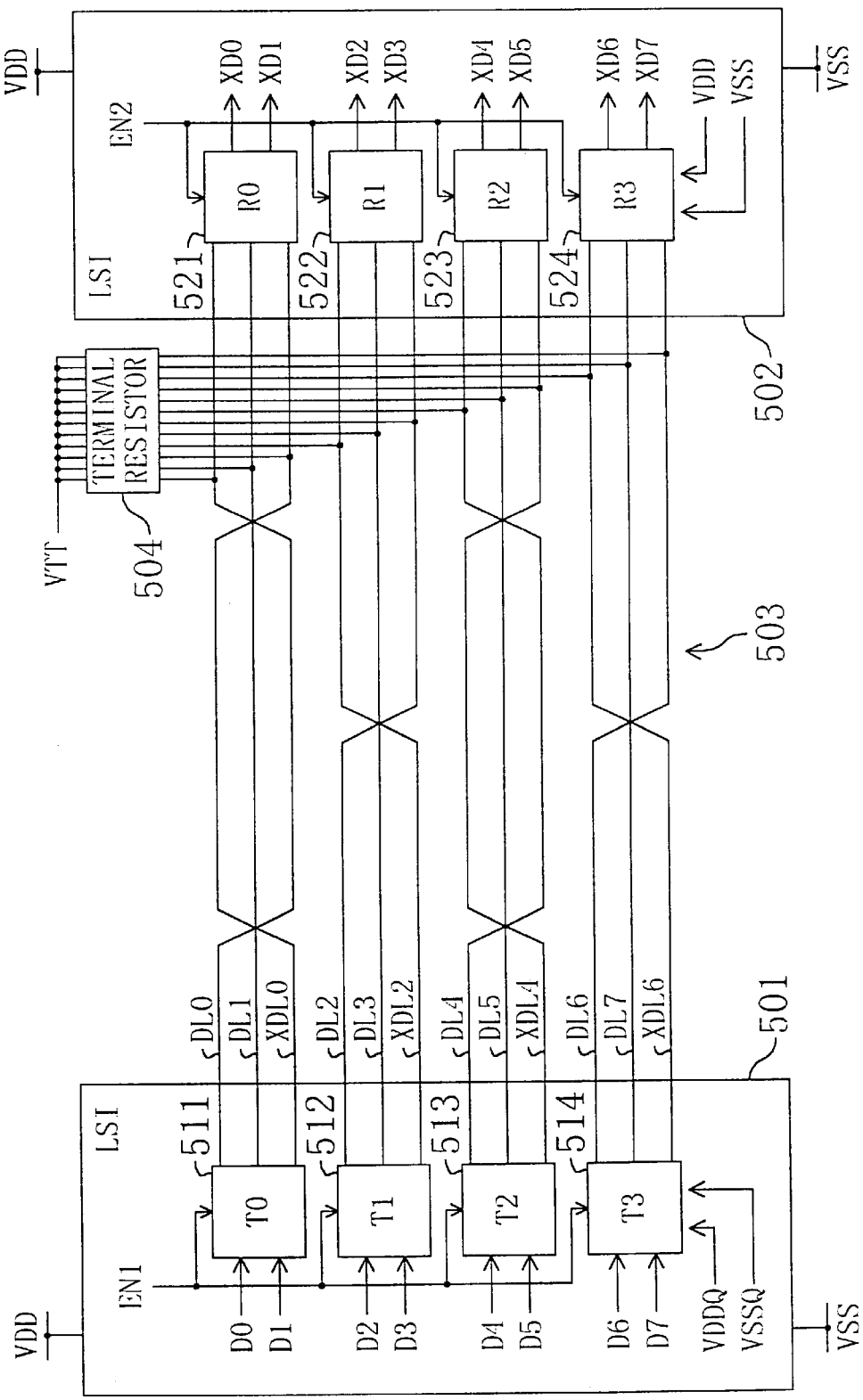
FIG. 15 is a block diagram showing another exemplary structure of the data transmission system according to the present invention.

FIG. 15 shows another exemplary structure of the data transmission system according to the present invention. The system shown in FIG. 15 is composed of two semiconductor integrated circuits mounted on a printed wiring board, e.g., two LSIs 501 and 502 which are connected to each other by a transmission channel 503. The LSI 501 transmits eight data bits D0 to D7 composing a word to the transmission channel 503, while the LSI 502 receives the 8-bit word transmitted via the transmission channel 503. Each of the twelve lines composing the transmission channel 503 has been pulled up to the terminal voltage VTT via terminal resistors 504.

The LSI 501 is internally provided with four transmitting units (T0, T1, T2, and T3) 511, 512, 513, and 514 each of which performs a transmitting operation upon activation of an enable signal EN1. The transmitting unit 511 is for transmitting the bits D0 and D1. The transmitting unit 511 supplies a voltage representing the value of the bit D0 onto a data line DL0, a voltage representing the value of the bit D1 onto a data line DL1, and a voltage representing the value obtained by inverting the bit D0 to a complementary data line XDL0. Each of the other three transmitting units 512, 513, and 514 has the same function so that DL2 to DL7 denote data lines and XDL2, XDL4, and XDL6 denote complementary data lines. It is to be noted that power source voltages VDDQ and VSSQ produced within the LSI 501 from the external voltages VDD and VSS are supplied to the output stage of each of the four transmission units 511 to 514.

The data line DL0 and the complementary data line XDL0 have been twisted twice around the data line DL1 to compose a twisted pair of lines. The twists have been imparted to respective portions corresponding to ⅓ and ⅔ of the entire lengths of the data line DL0 and the complementary data line XDL0. The data line DL2 and the complementary data line XDL2 have been twisted once around the data line DL3 to compose another twisted pair of lines. The twist has been imparted to respective portions corresponding to ½ of the entire lengths of the data line DL2 and the complementary data line XDL2. As a result, the data line DL2 and the complementary data line XDL2 are equally influenced by the data line DL0 and the complementary data line XDL0, while the data line DL0 and the complementary data line XDL0 are equally influenced by the data line DL2 and the complementary data line XDL2 by counteraction. The data line DL3 is shielded by the data line DL2 and the complementary data line XDL2, while the data line DL1 is shielded by the data line DL0 and the complementary data line XDL0. Likewise, the data line DL4 and the complementary data line XDL4 have been twisted twice around the data line DL5 to form a twisted pair, while the data line DL6 and the complementary data line XDL6 have been twisted once around the data line DL7 to form another twisted pair. The numbers of twists are not limited to the foregoing example.

The LSI 502 is internally provided with four receiving units (R0, R1, R2, and R3) 521, 522, 523, and 524 corresponding to the four transmitting units 511, 512, 513, and 514, respectively. Each of the four receiving units 521 to 524 performs a receiving operation upon activation of the enable signal EN2. The receiving unit 521 is for receiving the bits D0 and D1. The receiving unit 521 determines the value of the bit D0 through a comparison between the voltage on the data line DL0 and the voltage on the complementary data line XDL0. The receiving unit 521 determines the value of the bit D1 through a comparison between the respective voltages on the data lines DL0 and DL1 when the respective voltages on the data lines DL0 and DL1 are different from each other and through a comparison between the voltage on the complementary data line XDL0 and the voltage on the data line DL1 when the respective voltages on the data lines DL0 and DL1 are equal to each other. Each of the other three receiving units 522, 523, and 524 has the same function. In the drawing, XD0 to XD7 denote respective bits obtained by inverting the bits D0 to D7. An inverse relationship is established between the arrangement of the output terminals of the transmitting unit 512 and the arrangement of the input terminals of the receiving unit 522 since the data line DL2 and the complementary data line XDL2 have been twisted an odd number of times. The same relationship is established between the transmitting unit 514 and the receiving unit 524.

Figure 16:
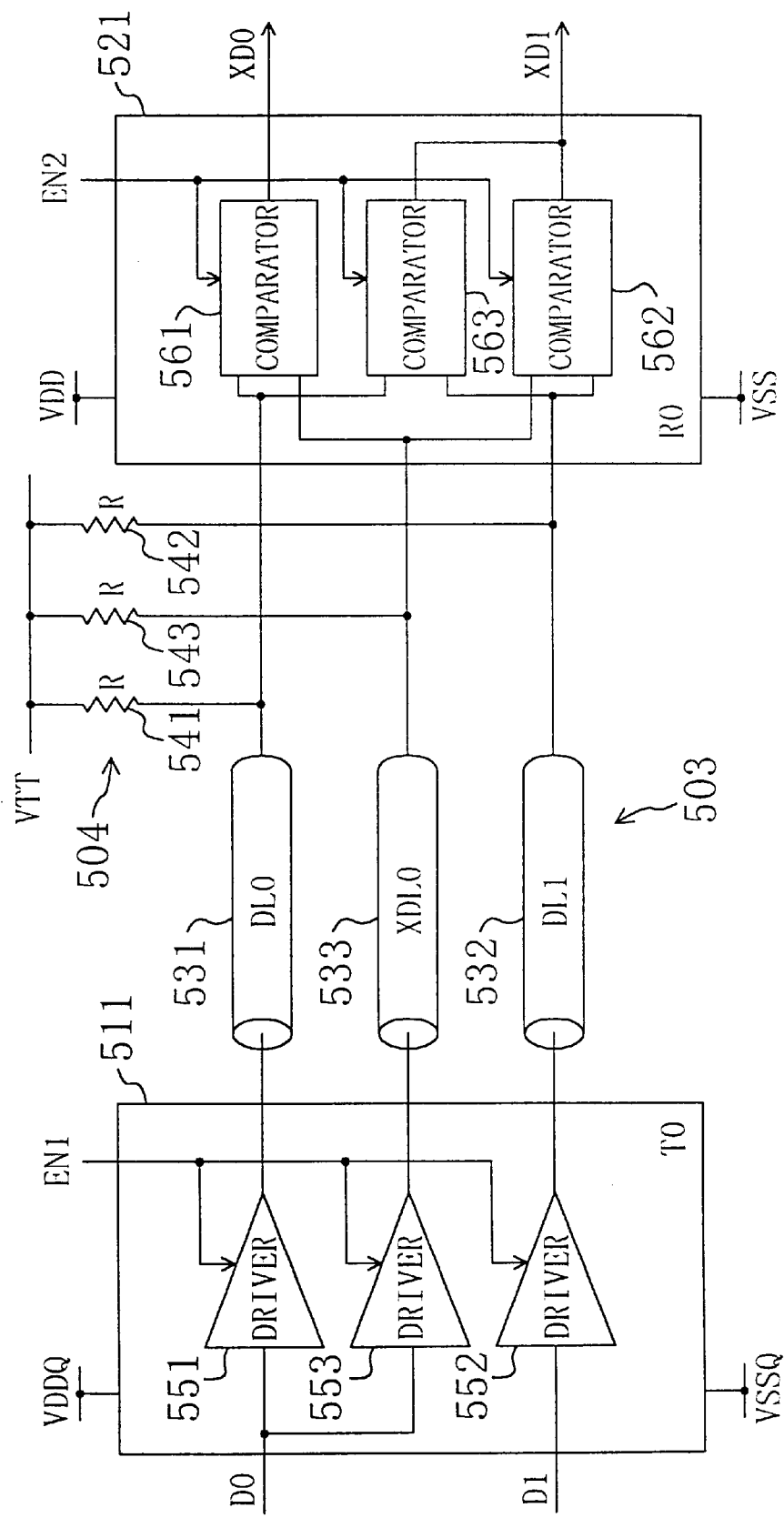
FIG. 16 is a block diagram showing in detail the respective structures of one transmitting unit and one receiving unit in FIG. 15.

FIG. 16 shows in detail the respective structures of one transmitting unit 511 and one receiving unit 521 in FIG. 15. It is to be noted that the twists imparted onto the data line DL0 and onto the complementary data line XDL0 are not depicted herein.

As shown in FIG. 16, the transmitting unit 511 has first, second, and third drivers 551, 552, and 553 each of which performs a transmitting operation upon activation of the enable signal EN1. The first driver 551 is for supplying the voltage representing the value of the bit D0 onto the data line (DL0) 531. The second driver 552 is for supplying the voltage representing the value of the bit D1 onto the data line (DL1) 532. The third driver 553 is for supplying a voltage representing the value obtained by inverting the bit D0 onto the complementary data line (XDL0) 533.

The data lines DL0 and DL1 and the complementary data line XDL0 have been pulled up to the terminal voltage VTT via the respective terminal resistors 541, 542, and 543 each having the resistance value R.

The receiving unit 521 has first, second, and third comparators 561, 562, and 563 each of which performs a receiving operation upon activation of the enable signal EN2. The first comparator 561 is for performing a comparison between the respective voltages on the data line DL0 and on the complementary data line XDL0. The second comparator 562 is for performing a comparison between the respective voltages on the data line DL1 and on the complementary data line XDL0. The third comparator 563 is for performing a comparison between the respective voltages on the data lines DL0 and DL1. The value of the bit D0 is determined only by the first comparator 561. When the respective voltages on the data lines DL0 and DL1 are different from each other, the third comparator 563 determines the value of the bit D1. When the respective voltages on the data lines DL0 and DL1 are equal to each other, the second comparator 562 determines the value of the bit D1.

Figure 17:
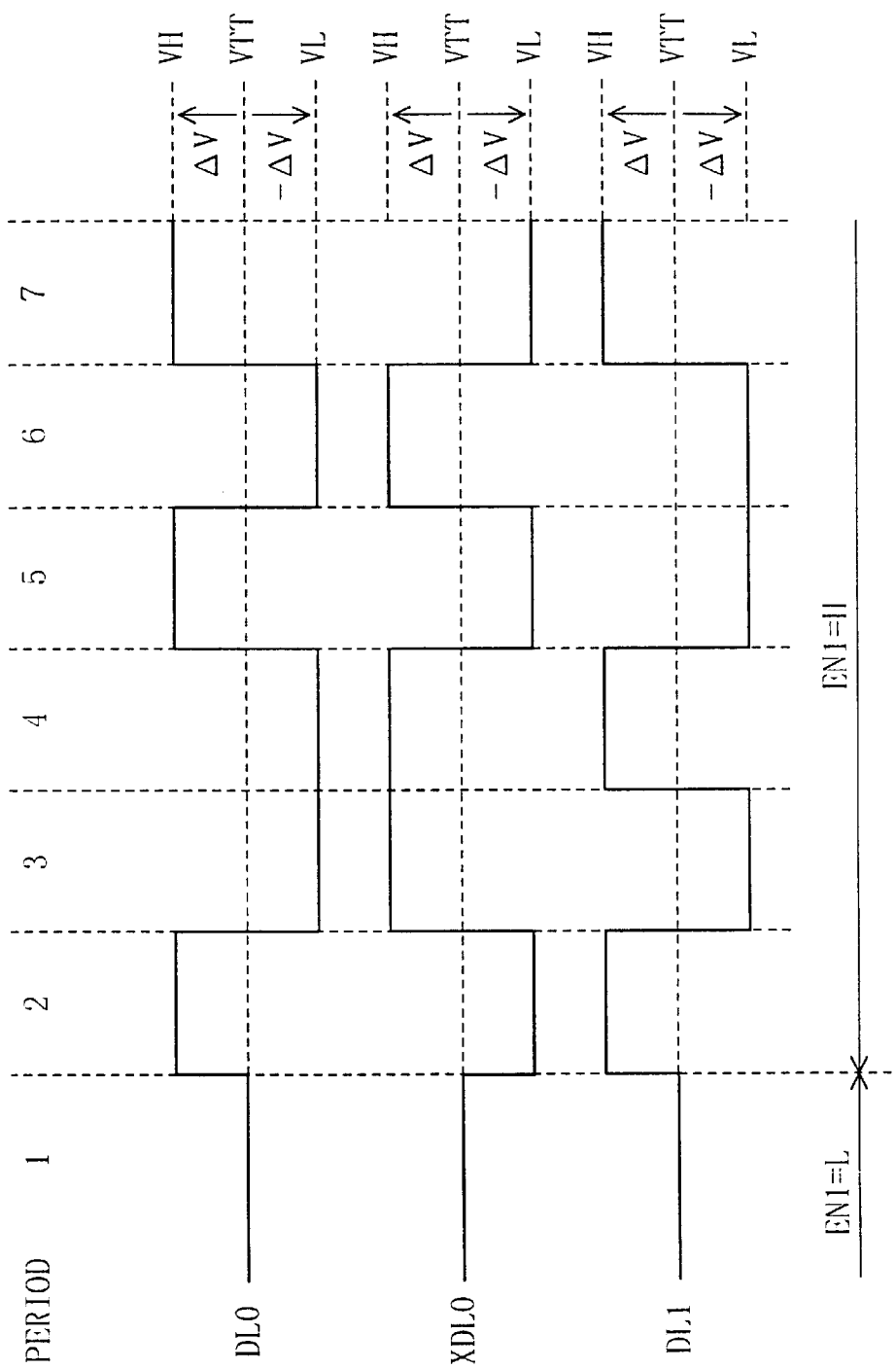
FIG. 17 is a timing chart showing an example of respective voltage variations on the three lines in FIG. 16.

FIG. 17 shows an example of respective voltage variations in the three lines DL0, XDL0, and DL1 in FIG. 16. During PERIOD 1, the enable signal EN1 is set to the inactivation level "L", so that the first, second, and third drivers 551, 552, and 553 hold the respective outputs thereof in the high-impedance state. Consequently, each of the voltages on the three lines DL0, XDL0, and DL1 becomes equal to the terminal voltage VTT. During PERIODS 2 to 7, the setting of the enable signal EN1 is changed to the activation level "H", so that each of the first, second, and third drivers 551, 552, and 553 performs the transmitting operation responsive to the data bits D0 and D1. During PERIOD 2, D0=1 and D1=1 are satisfied. Accordingly, the respective voltages on the data lines DL0 and DL1 become a high-level voltage VH representing a bit value 1 during PERIOD 2, while the voltage on the complementary data line XDL0 becomes a low-level voltage VL. The voltage VH is higher than the terminal voltage VTT by $\Delta V$, while the voltage VL is lower than the terminal voltage VTT by $\Delta V$. During PERIOD 3, D0=0 and D1=0 are satisfied. Accordingly, each of the voltages on the data lines DL0 and DL1 becomes the low-level voltage VL representing the bit value 0 during PERIOD 3, while the voltage on the complementary data line XDL0 becomes the high-level voltage VH representing the bit value 1. During PERIOD 4, D0=0 and D1=1 are satisfied. During PERIOD 5, D0=1 and D1=0 are satisfied. The state during PERIOD 6 is the same as in PERIOD 3 and the state during PERIOD 7 is the same as in PERIOD 2. Thus, each of the amplitudes of the respective voltages on the three lines DL0, XDL0, and DL1 is 2$\Delta V$. When VDD=+3.3 V, VSS=0 V, and VTT=+1.5 V are satisfied, for example, $\Delta V$=0.4 V (output value of the transmitting unit 511) is satisfied. The use of such a low-amplitude interface enables high-speed data transmission.

FIG. 18 shows combinations of respective voltages on the three lines DL0, XDL0, and DL1 in FIG. 16.

A description will be given below to the respective internal structures of the transmitting unit 511 and the receiving unit 521 in FIG. 16.

Figure 19:
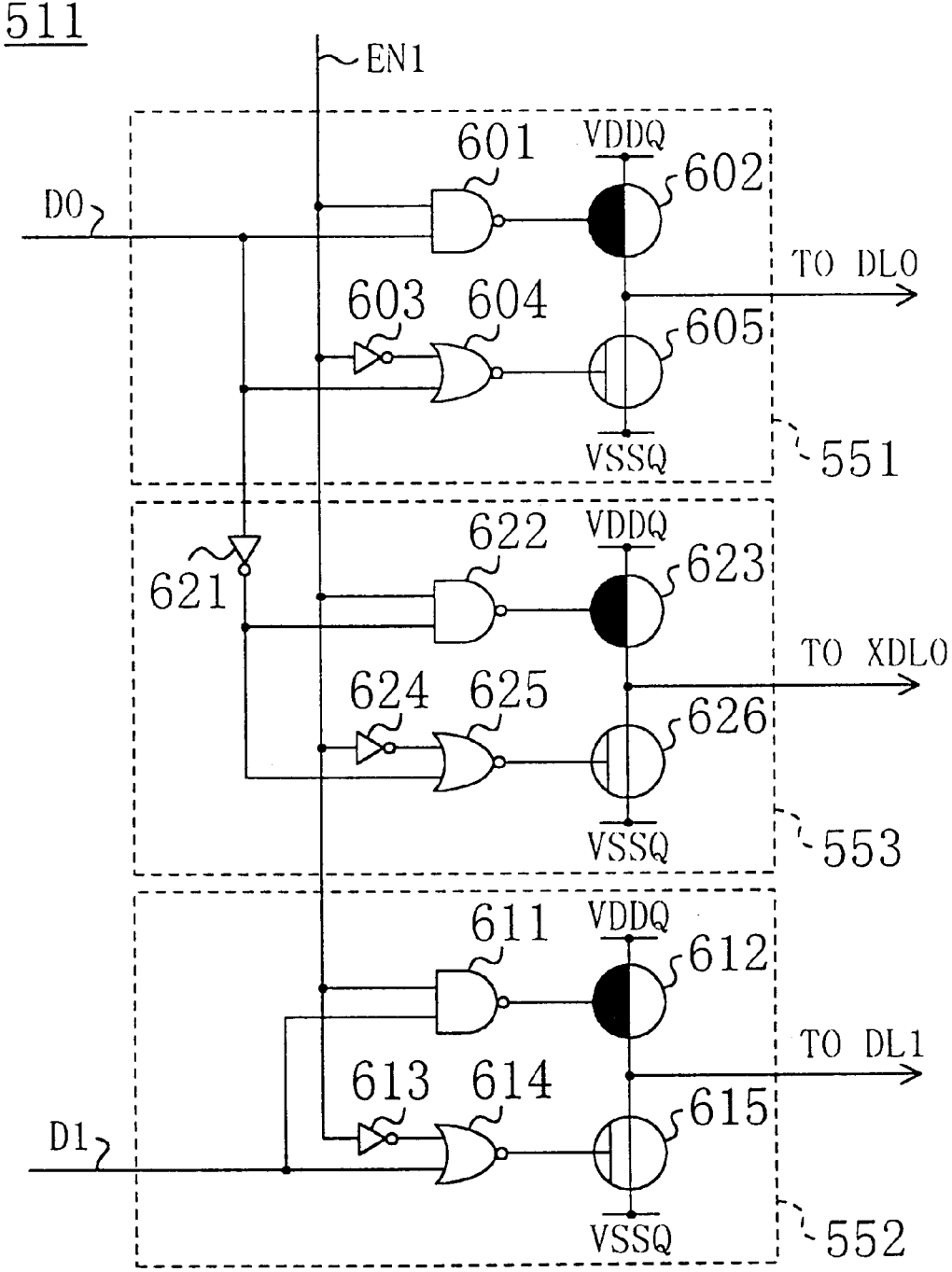
FIG. 19 is a detailed circuit diagram showing an exemplary structure of the transmitting unit in FIG. 16.

FIG. 19 shows an exemplary structure of the transmitting unit 511 in FIG. 16. The first driver 551 for driving the data line DL0 is composed of: a NAND gate 601; a PMOS transistor 602; an inverter 603; a NOR gate 604; and an NMOS transistor 605 and receives the data bit D0 and the enable signal EN1. The second driver 552 for driving the data line DL1 is composed of: a NAND gate 611; a PMOS transistor 612; an inverter 613; a NOR gate 614; and an NMOS transistor 615 and receives the data bit D1 and the enable signal EN1. The third driver 553 for driving the complementary data line XDL0 is composed of: an inverter 621; a NAND gate 622; a PMOS transistor 623; an inverter 624; a NOR gate 625; and an NMOS transistor 626 and receives the data bit D0 and the enable signal EN1.

Figure 20:
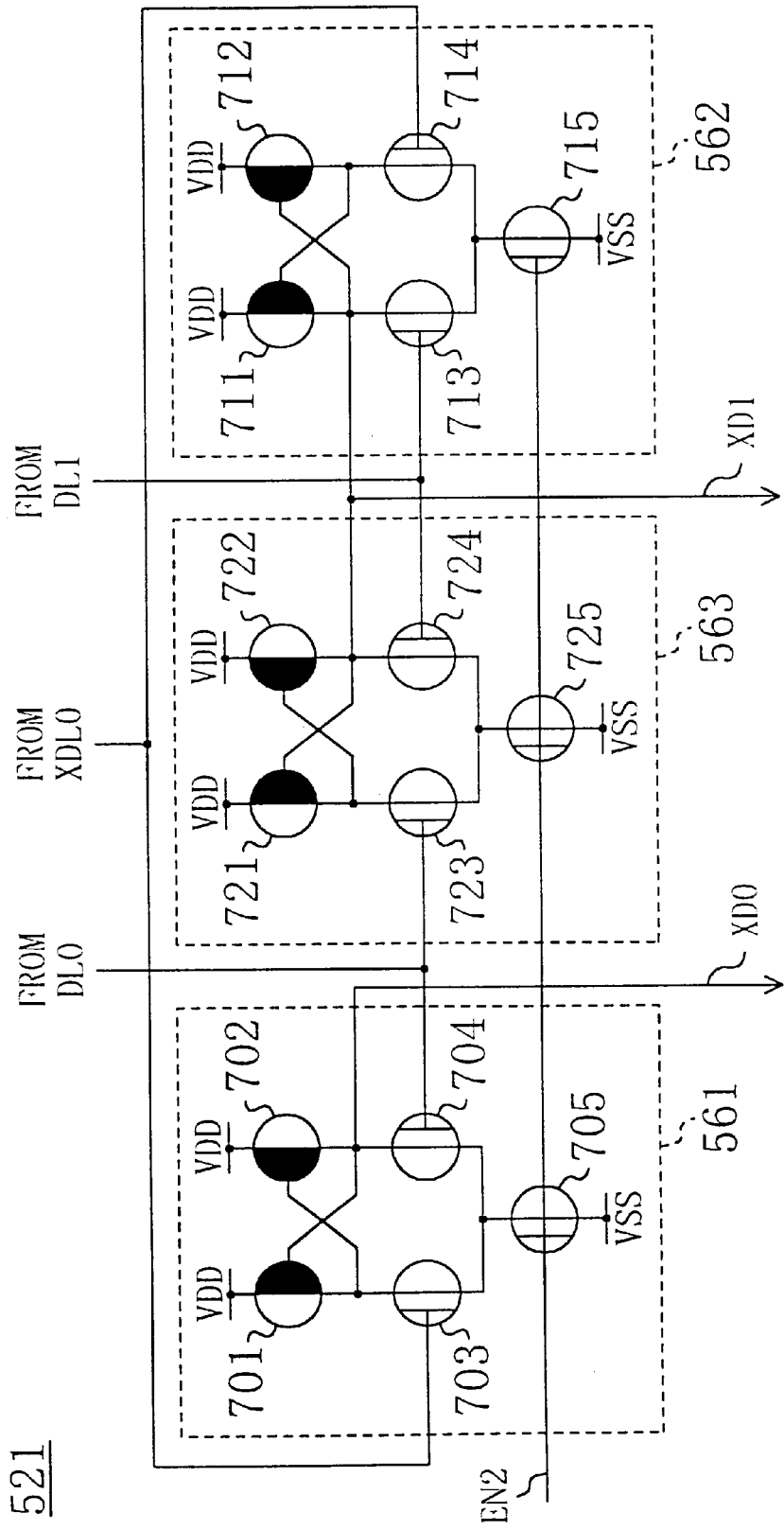
FIG. 20 is a detailed circuit diagram showing an exemplary structure of the receiving unit in FIG. 16.

FIG. 20 shows an exemplary structure of the receiving unit 521 in FIG. 16. The first comparator 561 for performing a comparison between the respective voltages on the data line DL0 and on the complementary data line XDL0 is composed of: two PMOS transistors 701 and 702; and three NMOS transistors 703, 704, and 705. The second comparator 562 for performing a comparison between the respective voltages on the data line DL1 and on the complementary data line XDL0 is composed of: two PMOS transistors 711 and 712; and three NMOS transistors 713, 714, and 715. The third comparator 563 for performing a comparison between the respective voltages on the data lines DL0 and DL1 is composed of: two PMOS transistors 721 and 722; and three NMOS transistors 723, 724, and 725. Each of the first, second, and third comparators 561, 562, and 563 is a circuit excellent in common-mode noise rejecting performance. An output of the first comparator 561 represents the data bit XD0 (bit obtained by inverting the bit D0). A wired OR connection is provided between an output of the second comparator 562 and an output of the third comparator 563 to determine the data bit XD1 (bit obtained by inverting the bit D1). Therefore, when the respective voltages on the data lines DL0 and DL1 are different from each other, the third comparator 563 determines the value of the bit XD1. On the other hand, when the respective voltages on the data lines DL0 and DL1 are equal to each other, the second comparator 562 determines the value of the bit XD1.

Figure 21:
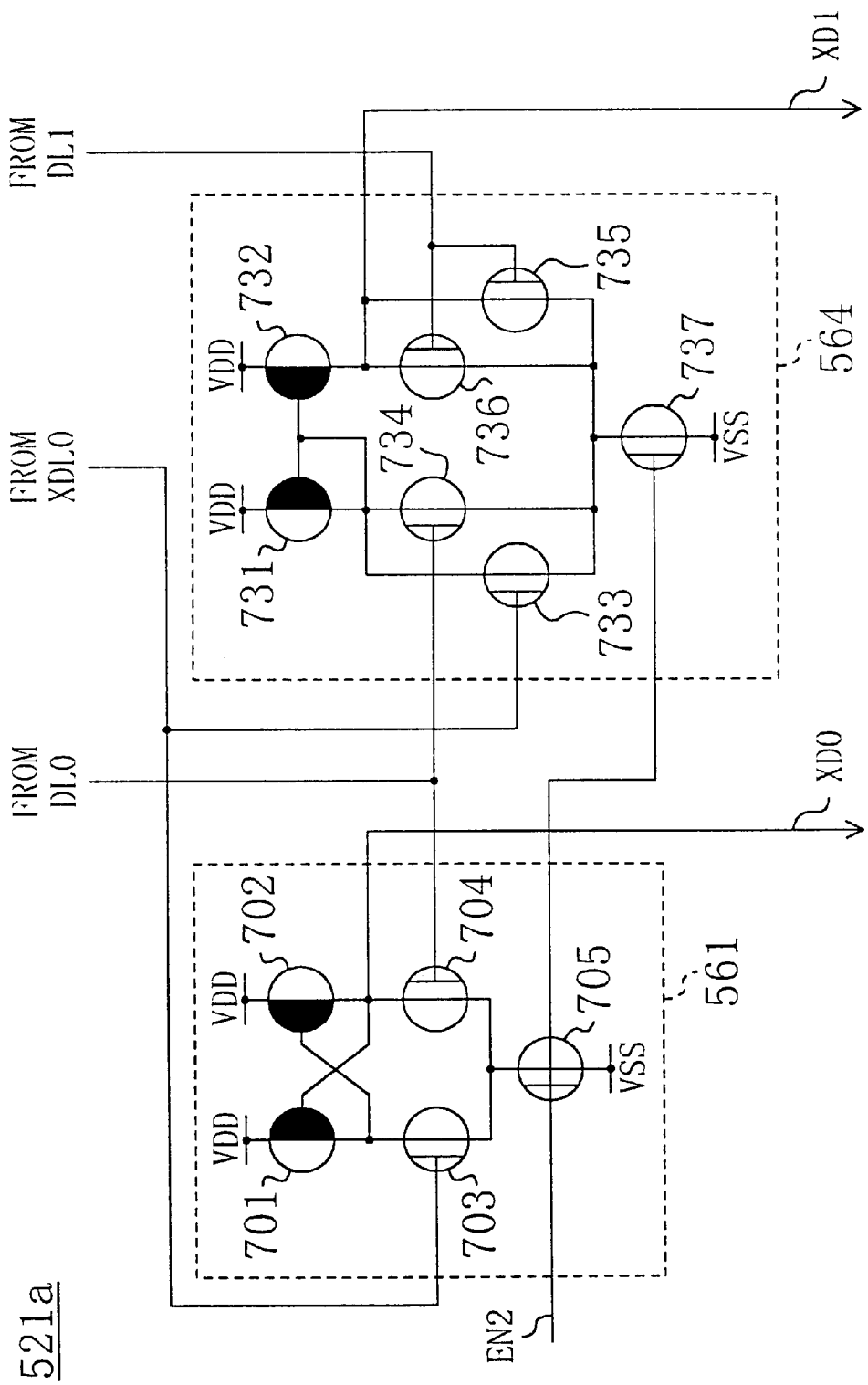
FIG. 21 is a detailed circuit diagram showing a variation of the receiving unit of FIG. 20.

FIG. 21 shows a variation of the receiving unit 521 of FIG. 20. A receiving unit 521a of FIG. 21 is obtained by replacing the second and third comparators 562 and 563 in the receiving unit 521 of FIG. 20 with a single (fourth) comparator 564. The fourth comparator 564 is composed of two PMOS transistors 731 and 732 and five NMOS transistors 733, 734, 735, 736, and 737 and determines the value of the bit XD1 through comparisons between the voltage on the data line DL1 and the respective voltages on the data line DL0 and on the complementary data line XDL0. With the structure shown in FIG. 21, the bit value can be determined with a smaller-scale structure than in the case shown in FIG. 20.

Figure 22:
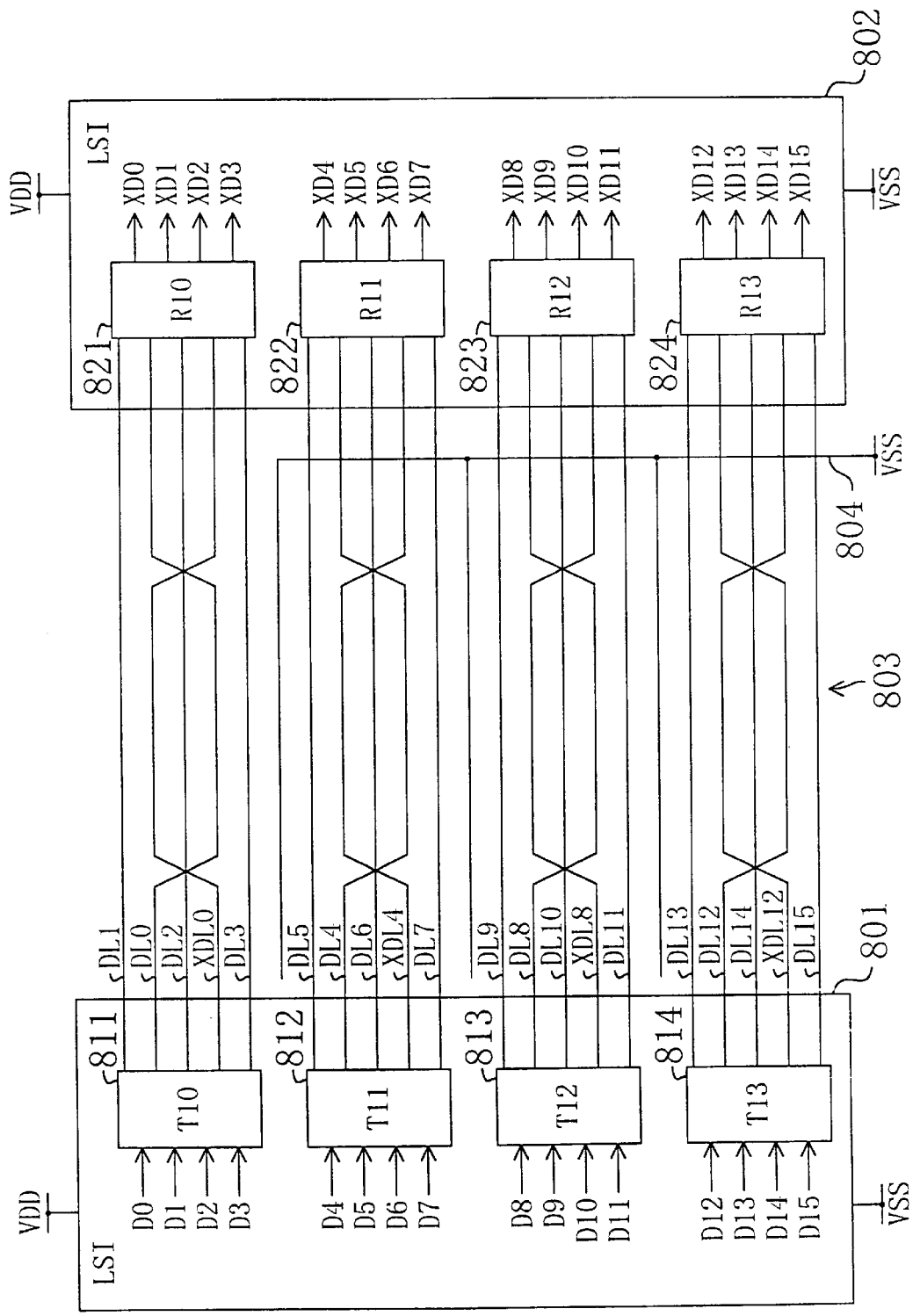
FIG. 22 is a block diagram showing still another exemplary structure of the data transmission system according to the present invention.

FIG. 22 shows still another exemplary structure of the data transmission system according to the present invention. The system shown in FIG. 22 is composed of two LSIs 801 and 802 which are connected to each other by a transmission channel 803. The LSI 801 transmits sixteen data bits D0 to D15 composing a word to the transmission channel 803, while the LSI 802 receives the 16-bit word transmitted via the transmission channel 803.

The LSI 801 is internally provided with four transmitting units (T10, T11, T12, and T13) 811, 812, 813, and 814. The transmitting unit 811 is for transmitting the bits D0, D1, D2, and D3. The transmitting unit 811 supplies a voltage representing the value of the bit D0 onto a data line DL0, a voltage representing the value of the bit D1 onto a data line DL1, a voltage representing the value of the bit D2 onto a data line DL2, a voltage representing the value of the bit D3 onto a data line DL3, and a voltage representing the value obtained by inverting the bit D0 onto a complementary data line XDL0. Each of the other three transmitting units 812, 813, and 814 has the same function so that DL4 to DL15 denote data lines and XDL4, XDL8, and XDL12 denote complementary data lines.

The data line DL0 and the complementary data line XDL0 have been twisted twice around the data line DL2 to compose a twisted pair of lines. The data lines DL1 and DL3 are further disposed externally of the twisted pair of lines to have them sandwiched therebetween. These five lines compose a subordinate transmission channel. As a result, the data line DL1 is equally influenced by the data line DL0 and the complementary data line XDL0, while the data line DL0 and the complementary data line XDL0 are equally influenced by the data line DL1. Similar relationships are established among the data lines DL3 and DL0 and the complementary data line XDL0. The data line DL2 is shielded by the data line DL0 and the complementary data line XDL0. This prevents interference between the data lines DL2 and DL1 as well as interference between the data lines DL2 and DL3. The other fifteen lines similarly compose subordinate transmission channels each consisting of five lines. Additionally, a shield line 804 is interposed between each adjacent two of the subordinate transmission channels.

The LSI 802 is internally provided with four receiving units (R10, R11, R12, and R13) 821, 822, 823, and 824 corresponding to the four transmitting units 811, 812, 813, and 814, respectively. The receiving unit 821 is for receiving the bits D0, D1, D2, and D3. The receiving unit 821 determines the value of the bit D0 through a comparison between the respective voltages on the data line DL0 and on the complementary data line XDL0. The receiving unit 821 determines the value of the bit D1 through a comparison between the respective voltages on the data lines DL0 and DL1 when the respective voltages on the data lines DL0 and DL1 are different from each other and through a comparison between the respective voltages on the complementary data line XDL0 and on the data line DL1 when the respective voltages on the data lines DL0 and DL1 are equal to each other. The receiving unit 821 determines the value of the bit D2 through a comparison between the respective voltages on the data lines DL0 and DL2 when the respective voltages on the data lines DL0 and DL2 are different from each other and through a comparison between the respective voltages on the complementary data line XDL0 and on the data line DL2 when the respective voltages on the data lines DL0 and DL2 are equal to each other. The receiving unit 821 determines the value of the bit D3 through a comparison between the respective voltages on the data lines DL0 and DL3 when the respective voltages on the data lines DL0 and DL3 are different from each other and through a comparison between the respective voltages on the complementary data line XDL0 and on the data line DL3 when the respective voltages on the data lines DL0 and DL3 are equal to each other. Each of the other three receiving units 822, 823, and 824 has the same function. In the drawing, XD0 to XD15 denote respective bits obtained by inverting the bits D0 to D15.

The structure shown in FIG. 22 uses the twenty lines and the shield line 804 to accomplish differential transmission of each of the sixteen data bits that has been accomplished by using the thirty two lines in the conventional differential transmission system, thereby achieving the effect of accomplishing differential data transmission excellent in common-mode noise rejecting performance.

Although the description has thus far been given to data transmission between a plurality of LSIs mounted on a printed wiring board, the present invention is also applicable to data transmission between a plurality of LSI ships composing a single multi-chip module and to intra-LSI-chip data transmission. The number of data bits composing a word is not limited to 8 or 16 and is arbitrary.

What is claimed is:

1. A data transmission system for differential transmission of each of first and second data bits, said system comprising:
    a transmitting unit for transmitting said first and second data bits;
    a receiving unit for receiving said first and second data bits; and
    a first data line, a second data line, and a reference line each disposed between said transmitting unit and said receiving unit,
    said transmitting unit having the functions of:
    when said first and second data bits have different values, supplying a voltage representing the value of said first data bit onto said first data line and a voltage representing the value of said second data bit onto said second data line such that said second data line serves as a transmission path complementary to said first data line and that said first data line serves as a transmission path complementary to said second data line; and
    when said first and second data bits have equal values, supplying a voltage representing each of the values of said first and second data bits onto each of said first and second data lines and a voltage representing a value obtained by inverting each of said first and second data bits onto said reference line such that said reference line serves as a transmission path complementary to each of said first and second data lines.

2. The data transmission system according to claim 1, wherein said receiving unit has the functions of:
    when respective voltages on said first and second data lines are different from each other, determining the respective values of said first and second data bits through a comparison between the respective voltages on said first and second data lines; and
    when the respective voltages on said first and second data lines are equal to each other, determining the value of said first data bit through a comparison between the voltage on said first data line and a voltage on said reference line and determining the value of said second data bit through a comparison between the voltage on said second data line and the voltage on said reference line.

3. The data transmission system according to claim 1, wherein
    said transmitting unit and said receiving unit are disposed in respective semiconductor integrated circuits distinct from each other; and
    each of said first data line, said second data line, and said reference line is disposed on a printed wiring board.

4. The data transmission system according to claim 1, wherein said first and second data lines are twisted around said reference line to compose a twisted pair of lines.

5. The data transmission system according to claim 1, further comprising:
    three terminal resistors for individually pulling up said first data line, said second data line, and said reference line to a specified terminal voltage.

6. The data transmission system according to claim 5, wherein said transmitting unit further has the function of determining the voltage supplied onto said reference line such that an amplitude of the voltage on said reference line is equal to an amplitude of the voltage on each of said first and second data lines; and the one of said three terminal resistors for pulling up said reference line has a resistance value which is half the resistance value of each of the other two terminal resistors for individually pulling up said first and second data lines such that a current flowing through said reference line is double a current flowing through each of said first and second data lines.

7. The data transmission system according to claim 5, wherein said transmitting unit further has the function of determining the voltage supplied onto said reference line such that an amplitude of the voltage on said reference line is double in amplitude of the voltage on each of said first and second data lines; and the one of said three terminal resistors for pulling up said reference line has a resistance value which is equal to the resistance value of each of the other two terminal resistors for individually pulling up said first and second data lines such that a current flowing through said reference line is double a current flowing through each of said first and second data lines.

8. The data transmission system according to claim 1, wherein said transmitting unit has:

a first driver for supplying the voltage representing the value of said first data bit onto said first data line;

a second driver for supplying the voltage representing the value of said second data bit onto said second data line; and a third driver for supplying, when said first and second data bits have equal values, the voltage representing the value obtained by inverting each of said first and second data bits onto said reference line.

9. The data transmission system according to claim 8, wherein said third driver has means for holding an output of said third driver to said reference line in a high impedance state when said first and second data bits have different values.

10. The data transmission system according to claim 8, wherein said third driver has means for supplying a mean voltage of a voltage representing a bit value 0 and a voltage representing a bit value 1 when said first and second data bits have different values.

11. The data transmission system according to claim 8, wherein said third driver has means for supplying, onto said reference line, a voltage representing a bit value 0 for a given period of time when said reference line undergoes a transition from a voltage representing a bit value 1 to another voltage and supplying, onto said reference line, the voltage representing the bit value 1 for a given period of time when said reference line undergoes a transition from the voltage representing the bit value 0 to another voltage.

12. The data transmission system according to claim 1, wherein said receiving unit has:

a first comparator for performing a comparison between a voltage on said first data line and a voltage on said reference line;

a second comparator for performing a comparison between a voltage on said second data line and the voltage on said reference line; and a third comparator for performing a comparison between the voltage on said first data line and the voltage on said second data line, said third comparator determining the respective values of said first and second data bits when the respective voltages on said first and second data lines are different from each other, said first comparator determining the value of said first data bit and said second comparator determining the value of said second data bit when the respective voltages on said first and second data lines are equal to each other.

13. The data transmission system according to claim 1, wherein said receiving unit has:

a first comparator for performing a comparison between a voltage on said first data line and a voltage on said reference line;

a second comparator for performing a comparison between a voltage on said second data line and the voltage on said reference line;

a third comparator for performing a comparison between the voltage on said first data line and the voltage on said second data line;

a fourth comparator for determining the value of said first data bit based on a result of comparison obtained from said first comparator and a result of comparison obtained from said third comparator; and a fifth comparator for determining the value of said second data bit based on a result of comparison obtained from said second comparator and a result of comparison obtained from said third comparator.

14. A data transmission system for differential transmission of each of first and second data bits, said system comprising:

a transmitting unit for transmitting said first and second data bits;

a receiving unit for receiving said first and second data bits; and a first data line, a second data line, and a complementary data line each disposed between said transmitting unit and said receiving unit, said transmitting unit having the functions of supplying a voltage representing a value of said first data bit onto said first data line, supplying a value of said second data bit onto said second data line, and supplying a voltage representing a value obtained by inverting said first data bit onto said complementary data line, said receiving unit having the functions of determining the value of said first data bit through a comparison between a voltage on said first data line and a voltage on said complementary data line and determining the value of said second data bit through a comparison between the voltage on said first data line and a voltage on said second data line when the respective voltages on said first and second data lines are different from each other and through a comparison between the voltage on said complementary data line and the voltage on said second data line when the respective voltages on said first and second data lines are equal to each other.

15. The data transmission system according to claim 14, wherein said transmitting unit and said receiving unit are disposed in respective semiconductor integrated circuits distinct from each other and each of said first data line, said second data line, and said complementary data line is disposed on a printed wiring board.

16. The data transmission system according to claim 14, wherein said first data line and said complementary data line are twisted around said second data line to compose a twisted pair of lines.

17. The data transmission system according to claim 16, further comprising:

third and fourth data lines being disposed between said transmitting unit and said receiving unit externally of said twisted pair of lines to have said twisted pair of lines sandwiched therebetween, wherein said transmitting unit further has the functions of supplying a voltage representing a value of a third data bit onto said third data line and supplying a voltage representing a value of a fourth data bit onto said fourth data line; and said receiving unit further has the functions of determining the value of said third data bit through a comparison between the voltage on said first data line and a voltage on said third data line when the respective voltages on said first and third data lines are different from each other and through a comparison between the voltage on said complementary data line and the voltage on said third data line when the respective voltages on said first and third data lines are equal to each other and determining the value of said fourth data bit through a comparison between the voltage on said first data line and a voltage on said fourth data line when the respective voltages on said first and fourth data lines are different from each other and through a comparison between the voltage on said complementary data line and the voltage on said fourth data line when the respective voltages on said first and fourth data lines are equal to each other.

18. The data transmission system according to claim 17, further comprising:

a transmission channel composed of said first, second, third, and fourth data lines and of said complementary line and a shield line interposed between the transmission channel and an adjacent transmission channel similarly composed of five lines.

19. The data transmission system according to claim 14, wherein said transmitting unit has:

a first driver for supplying the voltage representing the value of said first data bit onto said first data line;

a second driver for supplying the voltage representing the value of said second data bit onto said second data line; and a third driver for supplying the voltage representing the value obtained by inverting said first data bit onto said complementary data line.

20. The data transmission system according to claim 14, wherein said receiving unit has:

a first comparator for performing a comparison between the voltage on said first data line and the voltage on said complementary data line to determine the value of said first data bit;

a second comparator for performing a comparison between the voltage on said second data line and the voltage on said complementary data line; and a third comparator for performing a comparison between the voltage on said first data line and the voltage on said second data line, said third comparator determining the value of said second data bit when the respective voltages on said first and second data lines are different from each other and said second comparator determining the value of said second data bit when the respective voltages on said first and second data lines are equal to each other.

21. The data transmission system according to claim 14, wherein said receiving unit has:

a comparator for performing a comparison between the voltage on said first data line and the voltage on said complementary data line to determine the value of said first data bit; and another comparator for performing a comparison between each of the respective voltages on said first data line and on said complementary data line and the voltage on said second data line to determine the value of said second data bit.

* * * * *

UNITED STATES PATENT AND TRADEMARK OFFICE
CERTIFICATE OF CORRECTION

PATENT NO. : 6,317,465 B1
DATED : November 13, 2001
INVENTOR(S) : Hironori Akamatsu et al.

It is certified that error appears in the above-identified patent and that said Letters Patent is hereby corrected as shown below:

<u>Title page,</u>
ABSTRACT, line 13, "D1 and D1" should be -- D0 and D1 --

Signed and Sealed this

Twenty-eighth Day of May, 2002

Attest:

Attesting Officer

JAMES E. ROGAN
*Director of the United States Patent and Trademark Office*